(12) United States Patent
Wakui

(10) Patent No.: US 11,983,880 B2
(45) Date of Patent: May 14, 2024

(54) MINI-BATCH LEARNING APPARATUS, OPERATION PROGRAM OF MINI-BATCH LEARNING APPARATUS, AND OPERATION METHOD OF MINI-BATCH LEARNING APPARATUS

(71) Applicant: FUJIFILM Corporation, Tokyo (JP)

(72) Inventor: Takashi Wakui, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 17/336,846

(22) Filed: Jun. 2, 2021

(65) Prior Publication Data

US 2021/0287052 A1 Sep. 16, 2021

Related U.S. Application Data

(63) Continuation of application No. PCT/JP2019/042937, filed on Oct. 31, 2019.

(30) Foreign Application Priority Data

Dec. 14, 2018 (JP) .................................. 2018-234882

(51) Int. Cl.
*G06T 7/11* (2017.01)
*G06F 18/21* (2023.01)
(Continued)

(52) U.S. Cl.
CPC ............ *G06T 7/11* (2017.01); *G06F 18/2155* (2023.01); *G06F 18/2193* (2023.01);
(Continued)

(58) Field of Classification Search
CPC .......... G06N 3/045; G06N 3/08; G06N 3/084; G06N 20/00; G06F 30/27; G06F 18/24;
(Continued)

(56) References Cited

U.S. PATENT DOCUMENTS 11,200,664 B2 * 12/2021 Yuh ........................... G06T 7/11
11,477,460 B2 * 10/2022 Suzuki ................. H04N 19/154
(Continued)

FOREIGN PATENT DOCUMENTS

CN 108898604 A * 11/2018 ........... G06F 3/1407
JP 2017-107386 A 8/2017
(Continued)

OTHER PUBLICATIONS

Search machine translation of CN-108898604-A to Wang, retrieved Jun. 25, 2023, 26 pages. (Year: 2023).*
(Continued)

*Primary Examiner* — Matthew C Bella
*Assistant Examiner* — Dennis Rosario
(74) *Attorney, Agent, or Firm* — Birch, Stewart, Kolasch & Birch, LLP

(57) ABSTRACT

In a case where the operation program is started, a CPU of the mini-batch learning apparatus functions as a calculation unit, a specifying unit, and an evaluation unit. The calculation unit calculates an area ratio of each of a plurality of classes in mini-batch data. The specifying unit specifies, as a correction target class, a rare class of which the area ratio is lower than a setting value. The evaluation unit evaluates the class determination accuracy of the machine learning model by using a loss function. As correction processing, the
(Continued)

evaluation unit sets a weight for a loss value of the rare class to be larger than a weight for a loss value of a class other than the rare class.

20 Claims, 25 Drawing Sheets

(51) Int. Cl.
```
G06F 18/214      (2023.01)
G06F 18/241      (2023.01)
G06F 18/2431     (2023.01)
G06N 20/00       (2019.01)
G06T 7/62        (2017.01)
G06V 10/772      (2022.01)
G06V 10/774      (2022.01)
G06V 10/776      (2022.01)
G06V 20/69       (2022.01)
```
(52) U.S. Cl.
CPC ........ *G06F 18/241* (2023.01); *G06F 18/2431* (2023.01); *G06N 20/00* (2019.01); *G06T 7/62* (2017.01); *G06V 10/772* (2022.01); *G06V 10/774* (2022.01); *G06V 10/7747* (2022.01); *G06V 10/776* (2022.01); *G06V 20/69* (2022.01); *G06V 20/695* (2022.01); *G06V 20/698* (2022.01)

(58) Field of Classification Search
CPC .. G06F 18/2431; G06F 18/241; G06F 18/214; G06F 18/2155; G06F 18/2433; G06F 18/2411; G06F 18/24137; G06F 18/2413; G06F 2207/4824; G06F 16/35; G06F 16/355; G06F 16/353; G06F 16/55; G06T 2207/20081; G06T 2207/20084; G06T 7/0012; G06T 7/11; G06T 2207/30024; G06T 2207/30004; G06T 3/4046; G06T 9/002; G06T 2207/20021; G06T 2207/10056; G06T 2207/10061; G06T 7/62; G06T 2207/30096; G06T 2207/30088; G06T 2210/41; G06T 7/10; G06T 2210/12; G06T 2207/30064; G06T 2207/30044; G06T 2207/10132; G06T 2207/10081; G06T 11/20; G06T 2207/20112; G06V 10/82; G06V 10/764; G06V 40/172; G06V 10/454; G06V 2201/03; G06V 30/413; G06V 20/70; G06V 30/19173; G06V 10/26; G06V 10/7753; G06V 10/7784; G06V 10/7788; G06V 10/25; G06V 20/698; G06V 20/69; G06V 2201/034; G06V 20/695; G06V 30/19147; G06V 30/274; G06V 10/758; G06V 10/811; G06V 20/35; G06V 10/70; G06V 20/693; G16H 30/40; G16H 30/20; A61B 5/0013; A61B 90/36; A61B 8/469; A61B 5/7267; A61B 5/7264; A61B 6/032; A61B 5/7425; A61B 6/501; A61B 8/463; A61B 8/5207; A61B 90/361
See application file for complete search history.

(56) References Cited

U.S. PATENT DOCUMENTS

```
2017/0262735 A1    9/2017  Ros Sanchez et al.
2021/0090694 A1*   3/2021  Colley ................... G16H 50/70
2021/0287042 A1*   9/2021  Wakui ................... G06V 30/274
2022/0189149 A1*   6/2022  Shiraishi .............. G06V 10/764
```

FOREIGN PATENT DOCUMENTS

```
JP        2017-162456 A      9/2017
WO     WO2018/081537 A1      5/2018
```

OTHER PUBLICATIONS

BenTaieb, Analyzing Cancers in Digitized Histopathology Images (Thesis), Date created: Sep. 28, 2018, document file created Dec. 18, 2018, document file modified Feb. 13, 2019 [retrieved Jan. 25, 2023] , Simon Fraser University, pp. 1,34,35,73. Retrieved: https://summit.sfu.ca/item/18649 (Year: 2018).*

Zhe Li et al., Thoracic Disease Identification and Localization with Limited Supervision, Jun. 20, 2018 [retrieved Jun. 25, 2023], Cornell University:arXiv (open-access archive), 12 pages. Retrieved: https://arxiv.org/abs/1711.06373 (Year: 2018).*

Goff et al., Deep learning for cloud detection, Jul. 11-13, 2017 [retrieved Jan. 25, 2023], 8th International Conference of Pattern Recognition Systems, 6 pages. Retrieved: https://ieeexplore.ieee.org/abstract/document/8362079 (Year: 2017).*

Mingzhong Li, Detecting, segmenting and tracking bio-medical objects (Dissertation), 2016 [retrieved Jan. 25, 2023], Missouri University S&T, 80 pages. Retrieved: https://scholarsmine.mst.edu/doctoral_dissertations/2512/ (Year: 2016).*

Ke Li et al., Amodal Instance Segmentation, 1st Online: Sep. 17, 2016 [retrieved Jan. 25, 2023], European Conference on Computer Vision 2016, vol. LNCS 9906, pp. 677-693. Retrieved: https://link.springer.com/chapter/10.1007/978-3-319-46475-6_42 (Year: 2016).*

Google machine translation of Foreign Priority Data: Dec. 5, 2018 (JP) . . . JP2018-228402 of U.S. Pat. No. 11,477,460 to Suzuki, translated May 12, 2023, 46 pages. (Year: 2023).*

Foreign Application Priority Data: Dec. 5, 2018 (JP) . . . JP2018-228402 of U.S. Pat. No. 11,477,460 to Suzuki, retrieved May 13, 2023, 38 pages. (Year: 2018).*

Google Translate Machine Translation of Foreign Application Priority Data: Sep. 27, 2019 (JP) . . . 2019-177219 to Shiraishi (US 2022/0189149 A1), Sep. 27, 2019 [translated Jul. 31, 2023], 43 pages. (Year: 2019).*

Foreign Application Priority Data: Sep. 27, 2019 (JP) . . . 2019-177219 to Shiraishi (US 2022/0189149 A1), 45 pages. (Year: 2019).*

Zhang et al., Hierarchical Scene Parsing by Weakly Supervised Learning with Image Descriptions, Jan. 30, 2018 (1st instance of public dissemination) [retrieved Jan. 18, 2024], IEEE Transactions on Pattern Analysis and Machine Intelligence, vol. 41, Issue: 3, Mar. 1, 2019, pp. 596-610. Retrieved: (Year: 2018).*

[item U continued] https://ieeexplore.IEEE.org/abstract/document/8274992 (Year: 2018).*

Aizawa et al., "Application and Improvement of Encoder-Decoder CNN for Aircraft Image Segmentation," ITE Technical Report, vol. 40, No. 28, Aug. 31, 2016, pp. 9-10 (total 4 pages).

Aizawa et al., "Parts Segmentation of Encoder-Decoder CNN Incorporated Multi-resolution," The 23th Symposium on Sensing via Image Information (SSII2017), Jun. 7, 2017, 18 pages.

Hiramatsu et al., "Segmentation of Cell Image Integrated by Multiple CNNs." The 24th Symposium on Sensing via Image Information (SSII2018), Jun. 13, 2018, 19 pages.

International Preliminary Report on Patentability and Written Opinion of the International Searching Authority, with an English translation (forms PCT/IB/373, PCT/ISA/237 and PCT/IB/326), dated Jun. 24, 2021, for corresponding International Application No. PCT/JP2019/042937.

International Search Report (form PCT/ISA/210), dated Dec. 10, 2019, for corresponding International Application No. PCT/JP2019/042937, with an English translation.

Bokhorst et al., "Learning from sparsely annotated data for semantic segmentation in histopathology images." Proceedings of Machine Learning Research, vol. 102, 2019, pp. 84-91.

Extended European Search Report for corresponding European Application No. 19895335.8, daled Jan. 5, 2022.

(56) References Cited

OTHER PUBLICATIONS

Ren et al., "Learning to Reweight Examples for Robust Deep Learning," Proceedings of the 35th International Conference on Machine Learning, PMLR 80, 2018, (13 pages total).
Shimizu et al., "Balanced Mini-batch Training for Imbalanced Image Data Classification with Neural Network," 2018 First International Conference on Artificial Intelligence for Industries, IEEE, 2018, pp. 27-30.
European Communication pursuant to Article 94(3) EPC for corresponding European Application No. 19895335.8, dated Feb. 8, 2024,.

* cited by examiner

FIG. 1
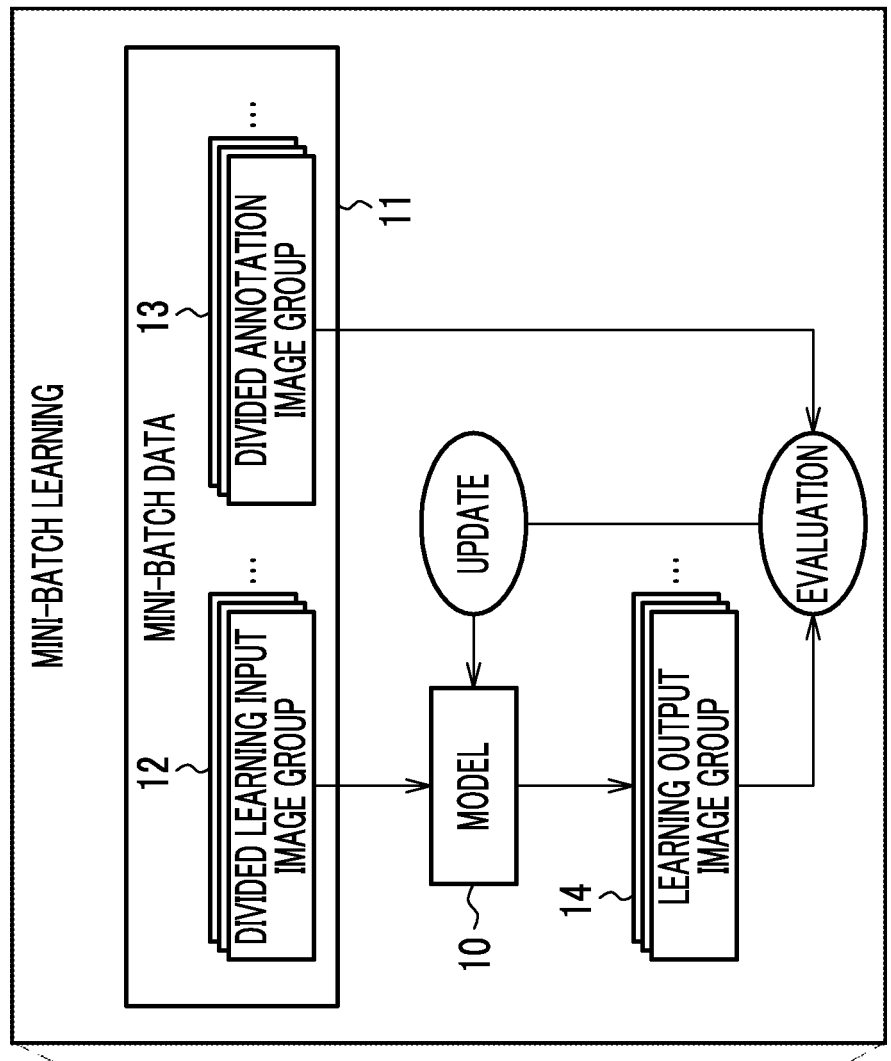
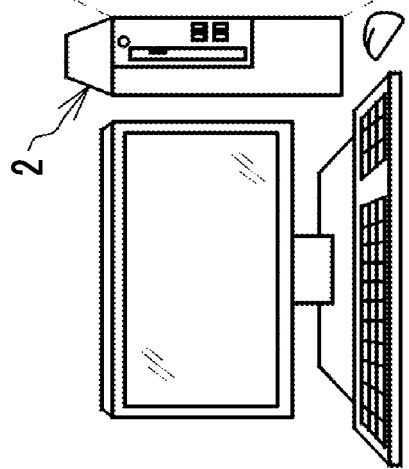

| 65A | CLASS | LOSS VALUE | WEIGHT COEFFICIENT | CALCULATED VALUE OF LOSS FUNCTION |
|---|---|---|---|---|
| | CLASS 1: DIFFERENTIATED CELLS | 25 | 1 | 62 |
| | CLASS 2: UNDIFFERENTIATED CELLS | 2 | 1 | |
| | CLASS 3: MEDIUM | 20 | 1 | |
| | CLASS 4: DEAD CELLS | 15 | 1 | |

(B)

| 65B | CLASS | LOSS VALUE | WEIGHT COEFFICIENT | CALCULATED VALUE OF LOSS FUNCTION |
|---|---|---|---|---|
| | CLASS 1: DIFFERENTIATED CELLS | 25 | 1 | 80 |
| | CLASS 2: UNDIFFERENTIATED CELLS | 2 | 10 | |
| | CLASS 3: MEDIUM | 20 | 1 | |
| | CLASS 4: DEAD CELLS | 15 | 1 | |

FIG. 21

| CLASS | AREA RATIO IN MINI-BATCH DATA (BEFORE ENLARGEMENT PROCESSING) | AREA RATIO IN LEARNING INPUT IMAGE AND ANNOTATION IMAGE |
|---|---|---|
| CLASS 1: DIFFERENTIATED CELLS | 38 | 26 |
| CLASS 2: UNDIFFERENTIATED CELLS | 2 | 20 |
| CLASS 3: MEDIUM | 40 | 28 |
| CLASS 4: DEAD CELLS | 20 | 26 |

ENLARGEMENT RATIO IN ENLARGEMENT PROCESSING = ×10

FIG. 25

| CLASS | AREA RATIO IN MINI-BATCH DATA (BEFORE ENLARGEMENT PROCESSING) | AREA RATIO IN LEARNING INPUT IMAGE AND ANNOTATION IMAGE |
|---|---|---|
| CLASS 1: DIFFERENTIATED CELLS | 14 | 26 |
| CLASS 2: UNDIFFERENTIATED CELLS | [56] | [28] |
| CLASS 3: MEDIUM | 15 | 21 |
| CLASS 4: DEAD CELLS | 15 | 25 |

REDUCTION RATIO IN REDUCTION PROCESSING = ×0.5

105

MINI-BATCH LEARNING APPARATUS, OPERATION PROGRAM OF MINI-BATCH LEARNING APPARATUS, AND OPERATION METHOD OF MINI-BATCH LEARNING APPARATUS

CROSS-REFERENCE TO RELATED APPLICATIONS

This application is a Continuation of PCT International Application No. PCT/JP2019/042937 filed on Oct. 31, 2019, which claims priority under 35 U.S.C § 119(a) to Japanese Patent Application No. 2018-234882 filed on Dec. 14, 2018. Each of the above application(s) is hereby expressly incorporated by reference, in its entirety, into the present application.

BACKGROUND OF TILE INVENTION

1. Field of the Invention

The technique of the present disclosure relates to a mini-hatch learning apparatus, an operation program of the mini-batch learning apparatus, and an operation method of the mini-batch learning apparatus.

2. Description of the Related Art

There is known semantic segmentation which determines a plurality of classes in an image in units of pixels. The semantic segmentation is realized by a machine learning model (hereinafter, simply referred to as a model) such as a U-shaped convolutional neural network (U-Net, U-shaped neural network).

In order to improve a determination accuracy of the model, it is necessary to update the model by inputting learning data to the model and learning the learning data. The learning data includes a learning input image and an annotation image in which a class in the learning input image is manually designated. In JP2017-107386A, from a plurality of learning input images, one learning input image which is a source of the annotation image is extracted.

SUMMARY OF THE INVENTION

For learning, there is a method called mini-batch learning. In mini-batch learning, as learning data, mini-batch data is input to the model. The mini-batch data includes some divided images (100 divided images) among a plurality of divided images obtained by dividing the learning input image and the annotation image (for example, 10000 divided images obtained by dividing an original image by a frame having a size of $1/100$ of the size of the original image). A plurality of sets (for example, 100 sets) of the mini-batch data are generated, and each set is sequentially input to the model.

Here, a case where there is a class bias in the learning input image and the annotation image is considered. For example; the learning input image is a phase-contrast-microscope image in which a state of cell culture appears. In the learning input image, differentiated cells are classified as a class 1, undifferentiated cells are classified as a class 2, a medium is classified as a class 3, and dead cells are classified as a class 4. In area ratios of classes in the entire learning input image and the entire annotation image, an area ratio of the differentiated cells is 38%, an area ratio of the undifferentiated cells is 2%, an area ratio of the medium is 40%, and an area ratio of the dead cells is 20%, and the area ratio of the undifferentiated cells is relatively low.

In a case where there is a class bias in the learning input image and the annotation image in this way, it is likely that there is also a class bias in the mini-batch data including the learning input image and the annotation image. In a case where there is a class bias in the mini-batch data, learning is performed without taking into account a rare class of which the area ratio is relatively low. As a result, a model with a low rare class determination accuracy is obtained.

In JP2017-107386A, as described above, from the plurality of learning input images, one learning input image which is a source of the annotation image is extracted. However, in this method, in a case where there is a class bias in all of the plurality of learning input images, a model with a low rare class determination accuracy is obtained in the end. As a result, the method described in JP2017-107386A cannot solve the problem that a model with a low rare class determination accuracy is obtained.

An object of the technique of the present disclosure is to provide a mini-batch learning apparatus capable of preventing a decrease in a class determination accuracy of a machine learning model for performing semantic segmentation, an operation program of the mini-batch learning apparatus, and an operation method of the mini-batch learning apparatus.

In order to achieve the object, according to the present disclosure, there is provided a mini-batch learning apparatus that learns a machine learning model for performing semantic segmentation, which determines a plurality of classes in an image in units of pixels, by inputting mini-batch data to the machine learning model, the apparatus including: a calculation unit that calculates an area ratio of each of the plurality of classes in the mini-batch data; a specifying unit that specifies a correction target class based on the area ratio; and an evaluation unit that evaluates a determination accuracy of the class of the machine learning model by calculating a loss value for each of the plurality of classes using a loss function and includes a correction processing unit which executes correction processing of correcting a first loss value of the correction target class based on a comparison result of the first loss value and a second loss value of a class other than the correction target class.

Preferably, the specifying unit specifies, as the correction target class, a rare class of which the area ratio is lower than a setting value which is set in advance, and the correction processing unit executes, as the correction processing, processing of setting a weight for the first loss value to be larger than a weight for the second loss value.

Preferably, the specifying unit specifies, as the correction target class, a non-rare class of which the area ratio is higher than a setting value which is set in advance, and the correction processing unit executes, as the correction processing, processing of setting a weight for the first loss value to be smaller than a weight for the second loss value.

Preferably, the specifying unit specifies, as the correction target class, a rare class of which the area ratio is lower than a setting value, and the correction processing unit executes, as the correction processing, enlargement processing of setting a correct answer value and a predicted value in calculation of the first loss value to be larger than a correct answer value and a predicted value in calculation of the second loss value. In this case, preferably, the correction processing unit sets an enlargement ratio in the enlargement processing such that the area ratio of the rare class in the mini-batch data is the same value as the area ratio of the rare class in a learning input image and an annotation image which are sources of the mini-batch data.

Preferably, the specifying unit specifies, as the correction target class, a non-rare class of which the area ratio is higher than a setting value, and the correction processing unit executes, as the correction processing, reduction processing of setting a correct answer value and a predicted value in calculation of the first loss value to be smaller than a correct answer value and a predicted value in calculation of the second loss value. In this case, preferably, the correction processing unit sets a reduction ratio in the reduction processing such that the area ratio of the non-rare class in the mini-batch data is the same value as the area ratio of the non-rare class in a learning input image and an annotation image which are sources of the mini-batch data.

Preferably, the mini-batch learning apparatus further includes a reception unit that receives a selection instruction as to whether or not to cause the correction processing unit to execute the correction processing.

According to the present disclosure, there is provided an operation program of a mini-batch learning apparatus that learns a machine learning model for performing semantic segmentation, which determines a plurality of classes in an image in units of pixels, by inputting mini-batch data to the machine learning model, the program causing a computer to function as: a calculation unit that calculates an area ratio of each of the plurality of classes in the mini-batch data; a specifying unit that specifies a correction target class based on the area ratio; and an evaluation unit that evaluates a determination accuracy of the class of the machine learning model by calculating a loss value for each of the plurality of classes using a loss function and includes a correction processing unit which executes correction processing of correcting a first loss value of the correction target class based on a comparison result of the first loss value and a second loss value of a class other than the correction target class.

According to the present disclosure, there is provided a non-transitory computer readable recording medium storing an operation program of a mini-batch learning apparatus that learns a machine learning model for performing semantic segmentation, which determines a plurality of classes in an image in units of pixels, by inputting mini-batch data to the machine learning model, the program causing a computer to function as: a calculation unit that calculates an area ratio of each of the plurality of classes in the mini-batch data; a specifying unit that specifies a correction target class based on the area ratio; and an evaluation unit that evaluates a determination accuracy of the class of the machine learning model by calculating a loss value for each of the plurality of classes using a loss function and includes a correction processing unit which executes correction processing of correcting a first loss value of the correction target class based on a comparison result of the first loss value and a second loss value of a class other than the correction target class.

According to the present disclosure, there is provided an operation method of a mini-batch learning apparatus that learns a machine learning model for performing semantic segmentation, which determines a plurality of classes in an image in units of pixels, by inputting mini-batch data to the machine learning model, the method including: a calculation step of calculating an area ratio of each of the plurality of classes in the mini-batch data; a specifying step of specifying a correction target class based on the area ratio; and an evaluation step of evaluating a determination accuracy of the class of the machine learning model by calculating a loss value for each of the plurality of classes using a loss function and including a correction processing step of executing correction processing of correcting a first loss value of the correction target class based on a comparison result of the first loss value and a second loss value of a class other than the correction target class.

According to the technique of the present disclosure, it is possible to provide a mini-batch learning apparatus capable of preventing a decrease in a class determination accuracy of a machine learning model for performing semantic segmentation, an operation program of the mini-batch learning apparatus, and an operation method of the mini-batch learning apparatus.

BRIEF DESCRIPTION OF THE DRAWINGS

FIG. 1 is a diagram illustrating a mini-batch learning apparatus and an outline of processing of the mini-batch learning apparatus.

FIG. 12 is a diagram illustrating a table in which a loss value of each class and a calculated value of a loss function are included, (a) of FIG. 12 illustrates a case where a weight for the loss value of each class is the same, and (b) of FIG. 12 illustrates a case where the weight for the loss value of a rare class is set to be larger than the weight for the loss value of a class other than the rare class.

FIG. 21 is a diagram illustrating a method of determining an enlargement ratio in enlargement processing.

FIG. 25 is a diagram illustrating a method of determining a reduction ratio in reduction processing.

DESCRIPTION OF THE PREFERRED EMBODIMENTS

First Embodiment

Figure 2:
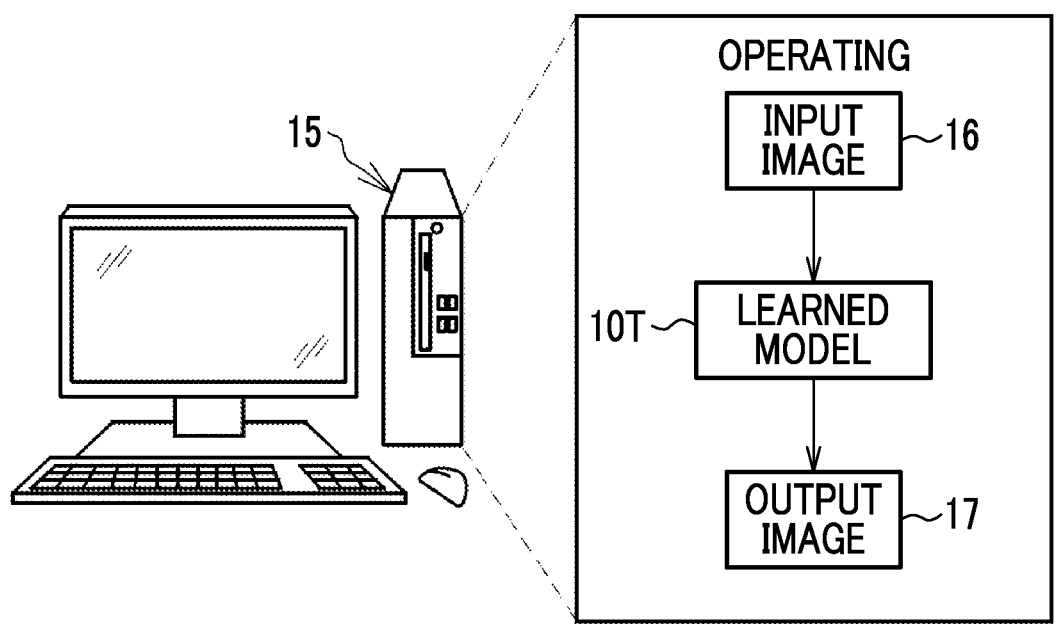
FIG. 2 is a diagram illustrating an operating apparatus and an outline of processing of the operating apparatus.

In FIG. 1, in order to improve a determination accuracy of a model 10 for performing semantic segmentation, which determines a plurality of classes in an input image in units of pixels, a mini-batch learning apparatus 2 performs mini-batch learning by inputting mini-batch data 11 to the model 10. The mini-batch learning apparatus 2 is, for example, a desktop personal computer. Further, the model 10 is, for example, U-Net.

The class may be referred to as a type of an object that appears in the input image. Further, in short, the semantic segmentation is a technique of determining a class and a contour of an object appearing in an input image, and the model 10 outputs a determination result as an output image. For example, in a case where three objects of a cup, a book, and a mobile phone appear in an input image, in an output image, ideally, each of the cup, the book, and the mobile phone is determined as a class, and contour lines that faithfully trace contours of these objects are drawn on each object.

By inputting the learning data to the model 10, learning the learning data, and updating the model 10, the class determination accuracy of the model 10 is improved. The learning data includes a pair of a learning input image which is to be input to the model 10 and an annotation image in which a class in the learning input image is manually designated. The annotation image is a correct answer image for matching an answer with a learning output image, which is output from the model 10 in accordance with the learning input image, and is compared with the learning output image. As the class determination accuracy of the model 10 is higher, a difference between the annotation image and the learning output image is smaller.

As described above, the mini-batch learning apparatus 2 uses mini-batch data 11 as the learning data. The mini-batch data 11 includes a divided learning input image group 12 and a divided annotation image group 13.

In mini-batch learning, the divided learning input image group 12 is input to the model 10. Thereby, a learning output image is output from the model 10 for each divided learning input image 20S (refer to FIG. 4) of the divided learning input image group 12. The learning output image group 14, which is a set of learning output images output from the model 10 in this way, is compared with the divided annotation image group 13, and thus a class determination accuracy of the model 10 is evaluated. The model 10 is updated according to an evaluation result of the class determination accuracy. The mini-batch learning apparatus 2 inputs the divided learning input image group 12 to the model 10, outputs the learning output image group 14 from the model 10, evaluates the class determination accuracy of the model 10, and updates the model 10 while changing the mini-batch data 11. The processing is repeated until the class determination accuracy of the model 10 reaches a desired level.

As illustrated in FIG. 2, the model 10 in which the class determination accuracy is raised to a desired level as described above is incorporated into an operating apparatus 15, as a learned machine learning model 10T (hereinafter, referred to as a learned model). An input image 16 in which a class and a contour of an appeared object are not yet determined is input to the learned model 10T. The learned model 10T determines a class and a contour of an object appeared in the input image 16, and outputs an output image 17 as a determination result. Similar to the mini-batch learning apparatus 2, the operating apparatus 15 is, for example, a desktop personal computer, and displays an input image 16 and an output image 17 side by side on a display. The operating apparatus 15 may be an apparatus different from the mini-batch learning apparatus 2 or the same apparatus as the mini-batch learning apparatus 2. Further, even after the learned model 101 is incorporated into the operating apparatus 15, the learned model 10T may be learned by inputting the mini-hatch data 11 to the learned model 10T.

Figure 3:
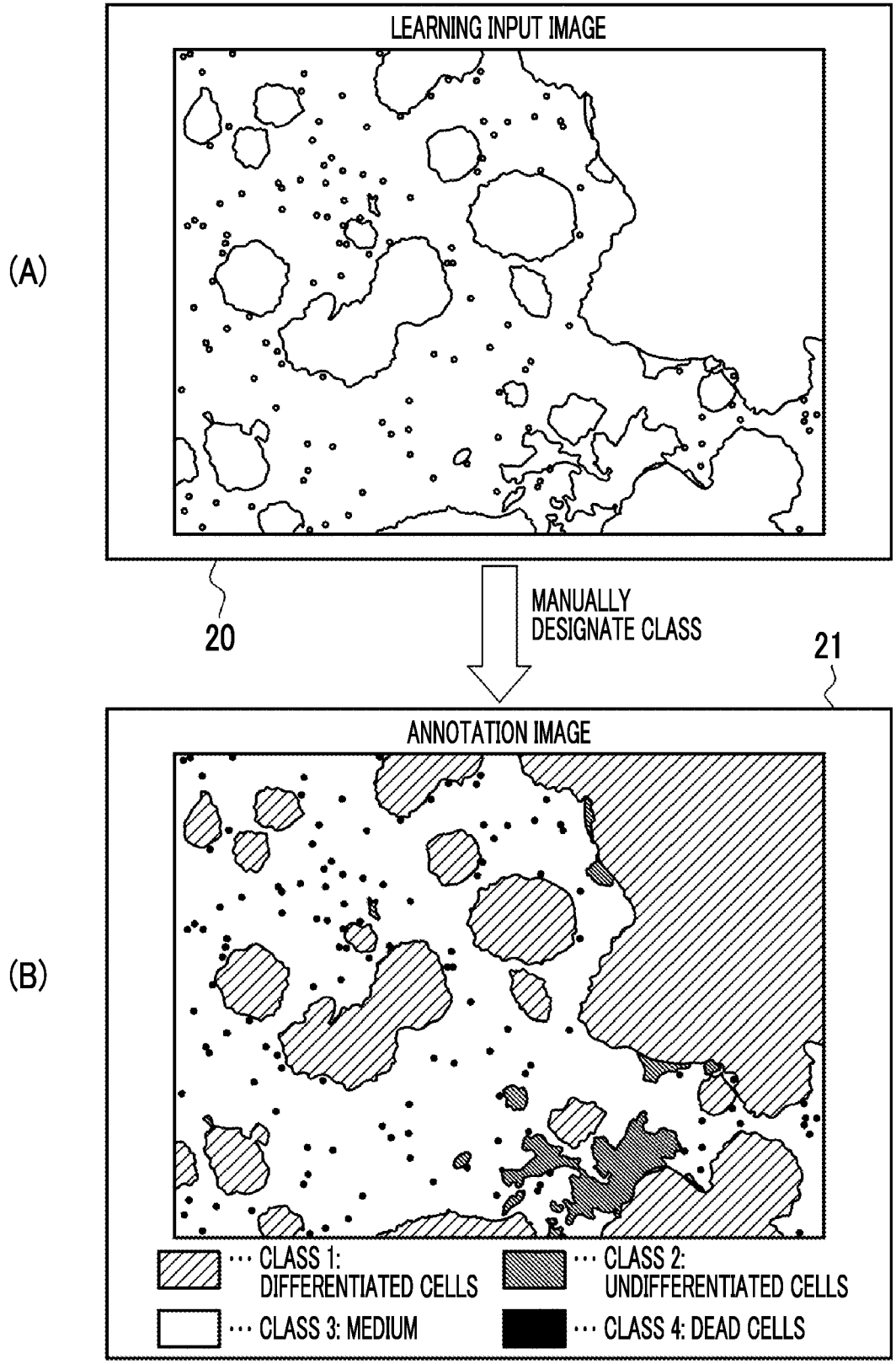
FIG. 3 is a diagram illustrating images, (a) of FIG. 3 illustrates a learning input image, and (b) of FIG. 3 illustrates an annotation image.

As illustrated in (a) of FIG. 3, the learning input image 20 is, in this example, one phase-contrast-Microscope image in which a state of cell culture appears. In the learning input image 20, differentiated cells, undifferentiated cells, a medium, and dead cells appear as objects. In this case, as illustrated in (b) of FIG. 3, in an annotation image 21, class-1 differentiated cells, class-2 undifferentiated cells, a class-3 medium, and class-4 dead cells are respectively and manually designated. The input image 16 which is input to the learned model 10T is also a phase-contrast-microscope image in which a state of cell culture appears, similar to the learning input image 20.

Figure 4:
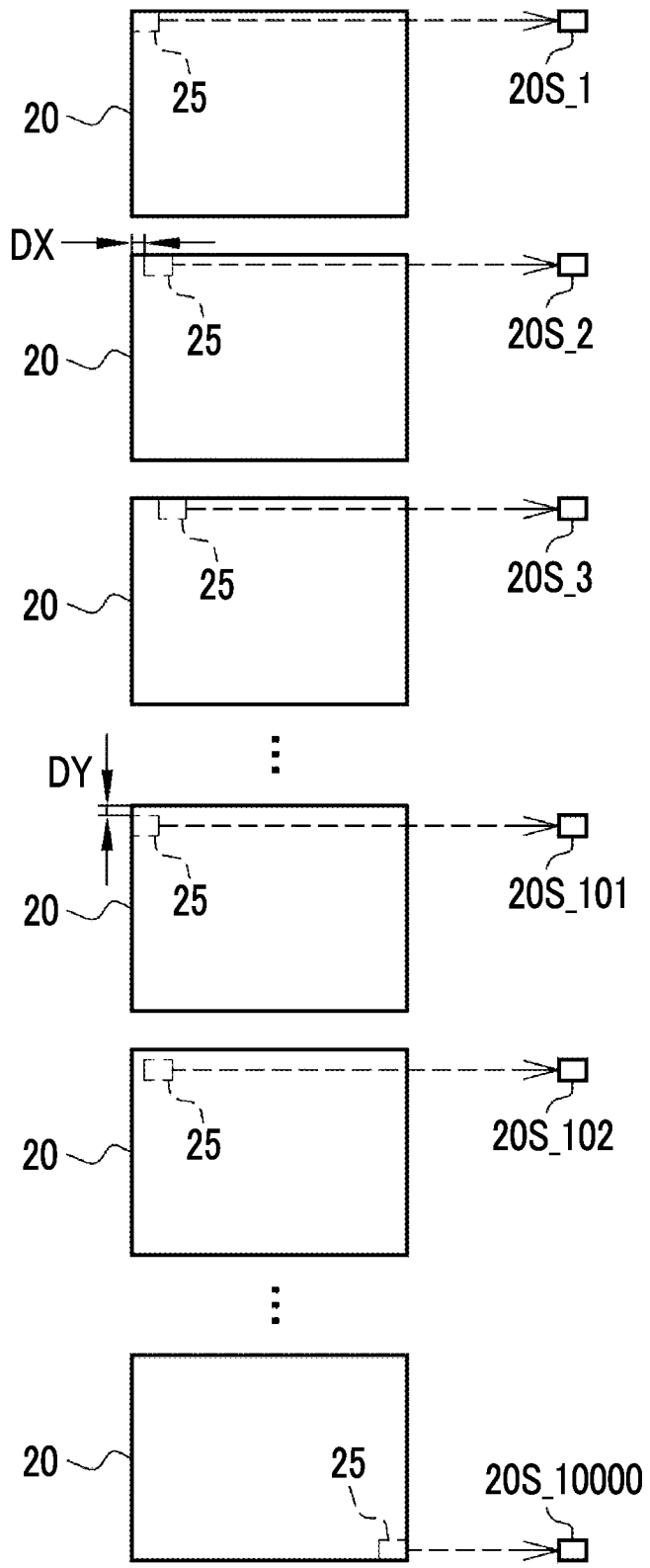
FIG. 4 is a diagram illustrating how a divided learning input image is generated from a learning input image.

As illustrated in FIG. 4, the divided learning input image 20S is obtained by cutting out a region surrounded by a rectangular frame 25, which is sequentially moved by DX in a horizontal direction and by DY in a vertical direction in the learning input image 20, each time. The movement amount DX of the frame 25 in the horizontal direction is, for example, ½ of a size of the frame 25 in the horizontal direction. Similarly, the movement amount DY of the frame 25 in the vertical direction is, for example. ½ of a size of the frame 25 in the vertical direction. A size of the frame 25 is, for example, ⅕₀ of the size of the learning input image 20. In this case, the divided learning input images 20S include a total of 10000 divided learning input images 20S_1 to 20S_10000.

Figure 5:
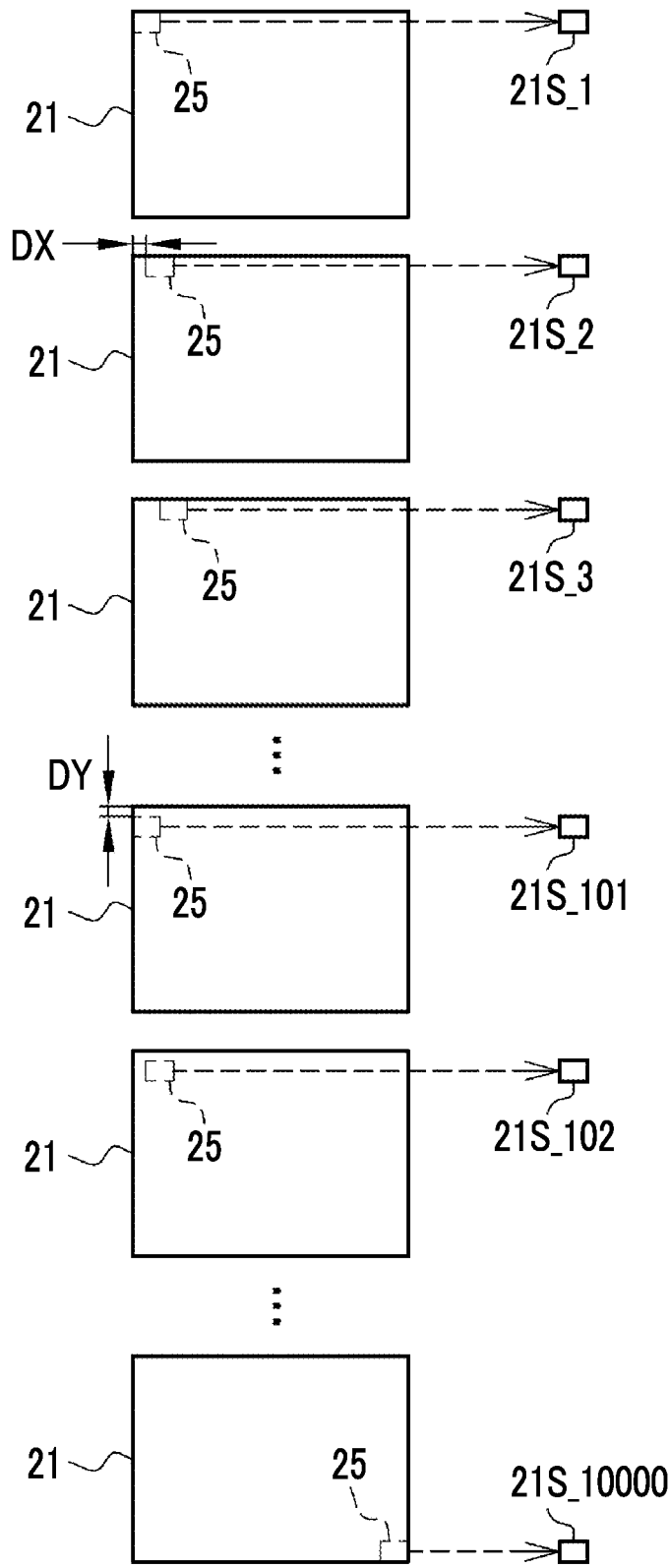
FIG. 5 is a diagram illustrating how a divided annotation image is generated from an annotation image.

Similarly, as illustrated in FIG. 5, the divided annotation image 21S is obtained by cutting out a region surrounded by a rectangular frame 25, which is sequentially moved by DX in the horizontal direction and by DY in the vertical direction in the annotation image 21, each time. In this case, the divided annotation images 21S include a total of 10000 divided annotation images 21S_1 to 21S_10000. In the following, it is assumed that the learning input image 20 and the annotation image 21 are already prepared in the mini-batch learning apparatus 2, and that the divided learning input images 20S and the divided annotation images 21S are already generated.

Figure 6:
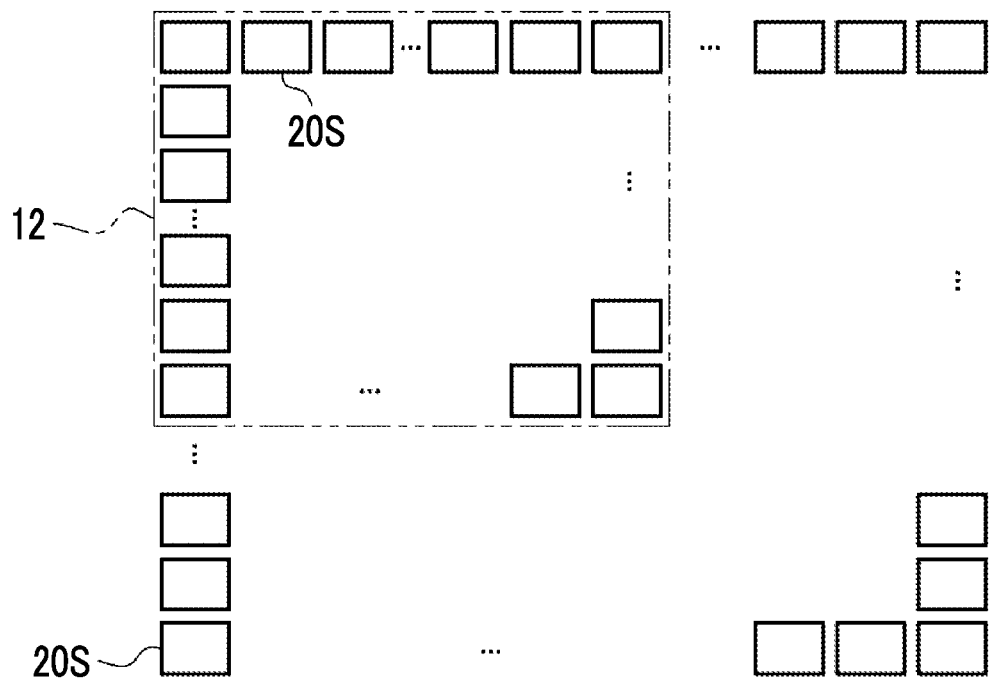
FIG. 6 is a diagram illustrating that a divided learning input image group includes some of a plurality of divided learning input images.
Figure 7:
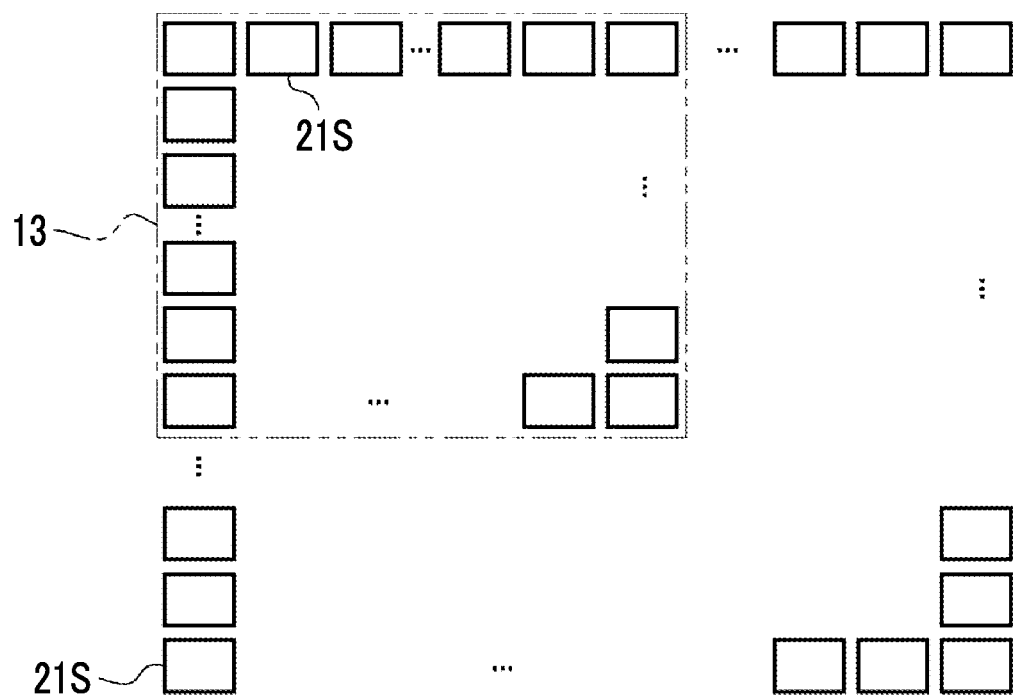
FIG. 7 is a diagram illustrating that a divided annotation image group includes some of a plurality of divided annotation images.

As illustrated in FIG. 6, the divided learning input image group 12 includes some divided learning input images 20S among the plurality of divided learning input images 20S generated as illustrated in FIG. 4 (for example, 100 divided learning input images 20S among 10000 divided learning input images 20S). Similarly, as illustrated in FIG. 7, the divided annotation image group 13 includes some divided annotation images 21S among the plurality of divided annotation images 21S generated as illustrated in FIG. 5 (for example, 100 divided annotation images 21S among 10000 divided annotation images 21S). The divided learning input image 20S included in the divided learning input image group 12 and the divided annotation image 21S included in the divided annotation image group 13 have the same region which is cut out by the frame 25.

Figure 8:
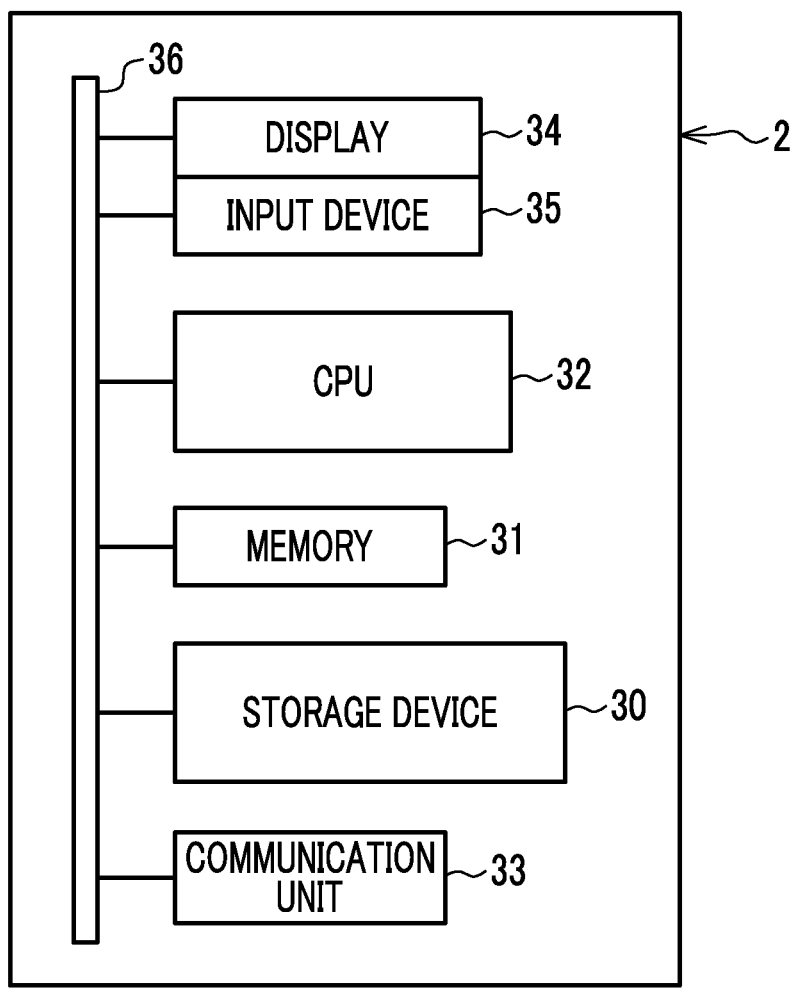
FIG. 8 is a block diagram illustrating a computer including the mini-batch learning apparatus.

In FIG. 8, a computer including the mini-hatch learning apparatus 2 includes a storage device 30, a memory 31, a central processing unit (CPU) 32, a communication unit 33, a display 34, and an input device 35. The components are connected to each other via a data bus 36.

The storage device 30 is a hard disk drive that is built in the computer including the mini-batch learning apparatus 2 or is connected via a cable or a network. Alternatively, the storage device 30 is a disk array in which a plurality of hard disk drives are connected in series. The storage device 30 stores a control program such as an operating system, various application programs, and various data associated with the programs.

The memory 31 is a work memory which is necessary to execute processing by the CPU 32. The CPU 32 loads the program stored in the storage device 30 into the memory 31, and collectively controls each unit of the computer by executing processing according to the program.

The communication unit 33 is a network interface that controls transmission of various information via a network such as a wide area network (WAN), for example, the Internet or a public communication network. The display 34 displays various screens. The various screens include operation functions by a graphical user interface (GUI). The computer including the mini-batch learning apparatus 2 receives an input of an operation instruction from the input device 35 via the various screens. The input device 35 includes a keyboard, a mouse, a touch panel, and the like.

Figure 9:
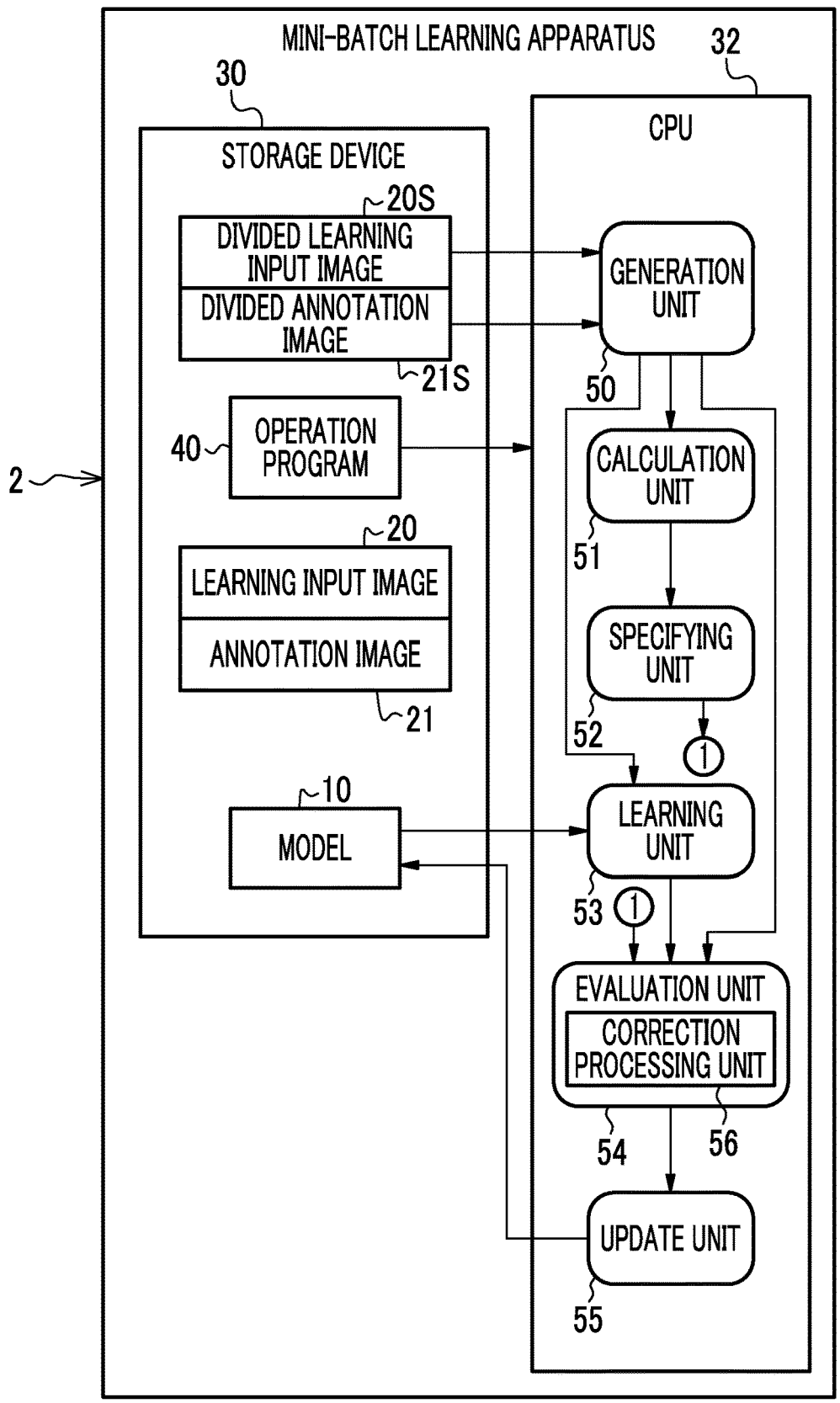
FIG. 9 is a block diagram illustrating a processing unit of a CPU of the mini-batch learning apparatus.

In FIG. 9, the storage device 30 stores the learning input image 20, the annotation image 21, the divided learning input images 20S, the divided annotation images 21S, and the model 10. Further, the storage device 30 stores an operation program 40 as an application program. The operation program 40 is an application program for operating the computer as the mini-batch learning apparatus 2.

In a case where the operation program 40 is started, the CPU 32 of the computer including the mini-batch learning apparatus 2 functions as a generation unit 50, a calculation unit 51, a specifying unit 52, a learning unit 53, an evaluation unit 54, and an update unit 55, in cooperation with the memory 31. The evaluation unit 54 includes a correction processing unit 56.

The generation unit 50 generates the mini-batch data 11 by selecting, as illustrated in FIGS. 6 and 7, some images from the divided learning input images 20S and the divided annotation images 21S generated from the learning input image 20 and the annotation image 21 illustrated in FIGS. 4 and 5. The generation unit 50 generates a plurality of sets (for example, 100 sets) of the mini-batch data 11. The generation unit 50 outputs the generated mini-batch data 11 to the calculation unit 51, the learning unit 53, and the evaluation unit 54.

The generation unit 50 may execute a method of increasing selection alternatives of the divided learning input images 20S and the divided annotation images 21S as the mini-batch data 11. Specifically, the generation unit 50 obtains additional images by performing image processing such as trimming, vertical inversion, or rotation on the divided learning input images 20S and the divided annotation images 21S, and sets the obtained images as new selection alternatives for the mini-batch data 11. The method is called data augmentation.

The calculation unit 51 calculates an area ratio of each of the plurality of classes in the mini-batch data 11. More specifically, the calculation unit 51 adds, for each class, the number of pixels of regions, which are manually designated in the divided annotation images 21S of the divided annotation image group 13 of the mini-batch data 11 generated from the generation unit 50. Next, the calculation unit 51 calculates an area ratio by dividing the added number of pixels by the total number of pixels of the divided annotation images 21S. For example, in a case where the added number of pixels of the regions designated as the class-1 differentiated cells is 10000 and the total number of pixels is 50000, the area ratio of the class-1 differentiated cells is (10000/50000)×100=20%. The calculation unit 51 outputs the calculated area ratio to the specifying unit 52.

The specifying unit 52 specifies a correction target class based on the area ratio. In the present embodiment, the specifying unit 52 specifies, as a correction target class, a rare class of which the area ratio is lower than a setting value which is set in advance. The specifying unit 52 outputs the specified rare class to the evaluation unit 54.

The learning unit 53 learns the model 10 by inputting, to the model 10, the divided learning input image group 12 of the mini-batch data 11 generated from the generation unit 50. Thereby, the learning unit 53 outputs, to the evaluation unit 54, the learning output image group 14 which is output from the model 10.

The evaluation unit 54 evaluates the class determination accuracy of the model 10 by comparing the divided annotation image group 13 of the mini-batch data 11 generated from the generation unit 50 with the learning output image group 14 output from the learning unit 53. The evaluation unit 54 outputs an evaluation result to the update unit 55.

The evaluation unit 54 evaluates the class determination accuracy of the model 10 by using a loss function L(TN, PN) to be described below. The loss function L(TN, PN) is a function representing a degree of a difference between the divided annotation image group 13 and the learning output image group 14. In the loss function L(TN, PN). TN represents a class determination state of the divided annotation image group 13, and corresponds to a correct answer value. PN represents a class determination state of the learning output image group 14, and corresponds to a predicted value. As a calculated value of the loss function L(TN, PN) is closer to 0, the class determination accuracy of the model 10 is higher.

$$L(TN, PN) \sum_{K=1}^{N} \{WK \cdot F(TK, PK)\}$$

N is the number of classes, and in this example, N=4. WK is a weight coefficient. F(TK, PK) is, for example, a categorical cross entropy function, F(TK, PK) corresponds to a loss value of each class. That is, the loss function L(TN, PN) is a sum of products of the loss value F(TK, PK) of each class and the weight coefficient WK. The evaluation unit 54 outputs, as the evaluation result, the calculated value of the loss function L(TN, PN) to the update unit 55.

The correction processing unit 56 performs correction processing of correcting a first loss value based on a comparison result of the first loss value which is a loss value of the correction target class and a second loss value which is a loss value of a class other than the correction target class. The correction processing includes processing of arranging the number of digits of the first loss value and the second loss value. The processing of arranging the number of digits is, for example, in a case where the number of digits of the first loss value is 1 and the number of digits of the second loss value is 2, processing of setting the number of digits of the first loss value to 2. Further, the correction processing includes processing of setting the first loss value and the second loss value to the same value. The processing of setting the first loss value and the second loss value to the same value includes not only processing of setting the first loss value and the second loss value to completely the same value, but also processing of setting the first loss value to be within a defined error range, for example, within a range of +50% of the second loss value (in a case where the second loss value is 50, processing of setting the first loss value to 25 to 75).

More specifically, the correction processing unit 56 executes, as the correction processing, processing of setting a weight for the first loss value to be larger than a weight for the second loss value. Here, the "weight" is a weight coefficient WK. Further, in the present embodiment, as described above, the correction target class is a rare class of which the area ratio is lower than the setting value. Therefore, in the present embodiment, the first loss value is the loss value F(TK, PK) of the rare class, and the second loss value is the loss value F(TK, PK) of the class other than the rare class. In other words, based on these facts, the correction processing unit 56 executes, as the correction processing, processing of setting the weight coefficient WK for the loss value F(TK, PK) of the rare class to be larger than the weight coefficient WK for the loss value F(TK, PK) of the class other than the rare class. For example, the correction processing unit 56 sets the weight coefficient WK for the loss value F(TK, PK) of the rare class to 10, and sets the weight coefficient WK for the loss value F(TK, PK) of the class other than the rare class to 1 (refer to FIGS. 11 and 12).

The update unit 55 updates the model 10 according to the evaluation result from the evaluation unit 54. More specifically, the update unit 55 changes various parameter values of the model 10, by a stochastic gradient descent method or the like using a learning coefficient. The learning coefficient indicates a change range in various parameter values of the model 10. That is, as the learning coefficient has a relatively large value, the change range in various parameter values becomes wider, and thus, an update level of the model 10 becomes higher.

Figure 10:
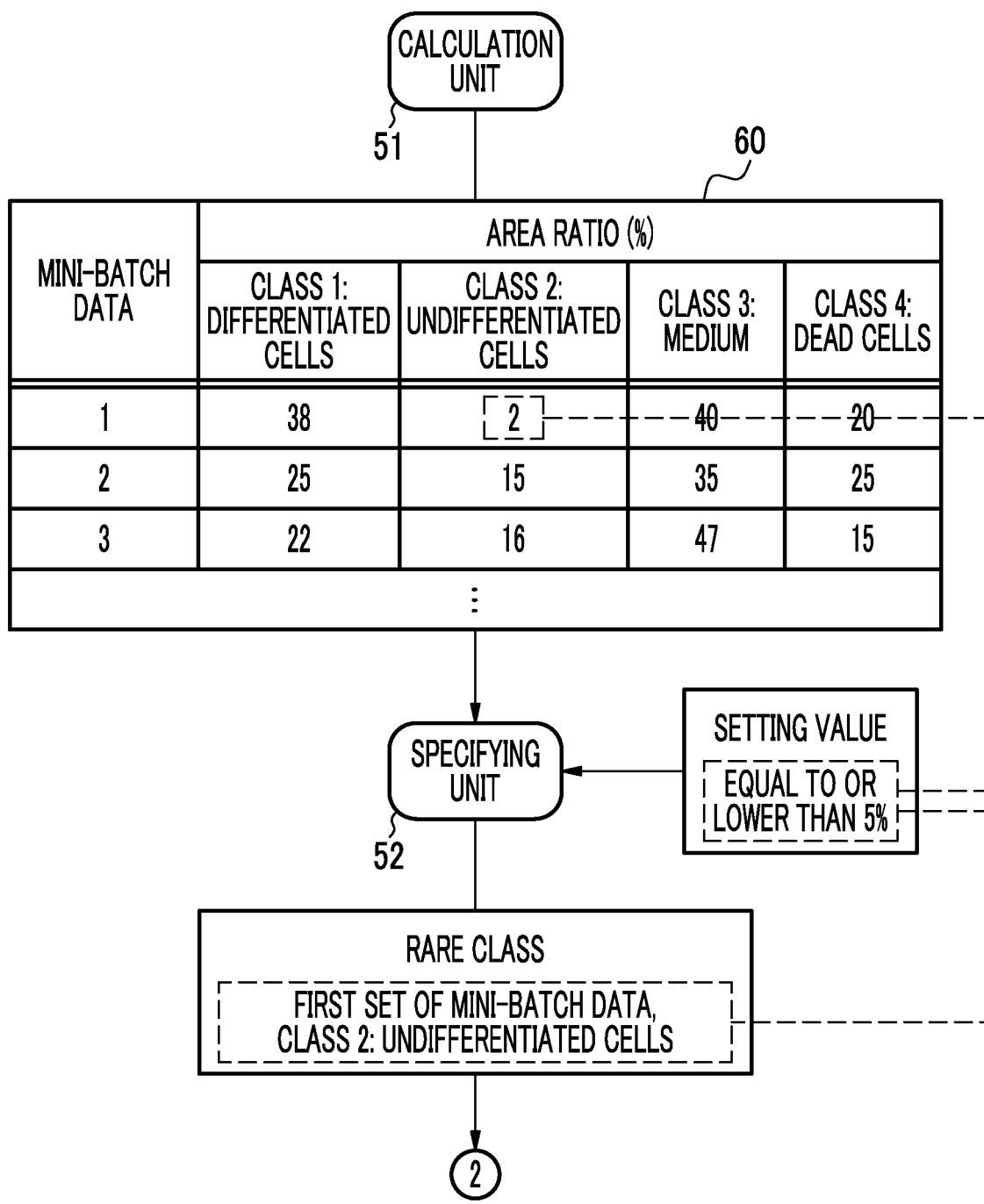
FIG. 10 is a diagram illustrating a specific example of processing of a calculation unit and a specifying unit.
Figure 11:
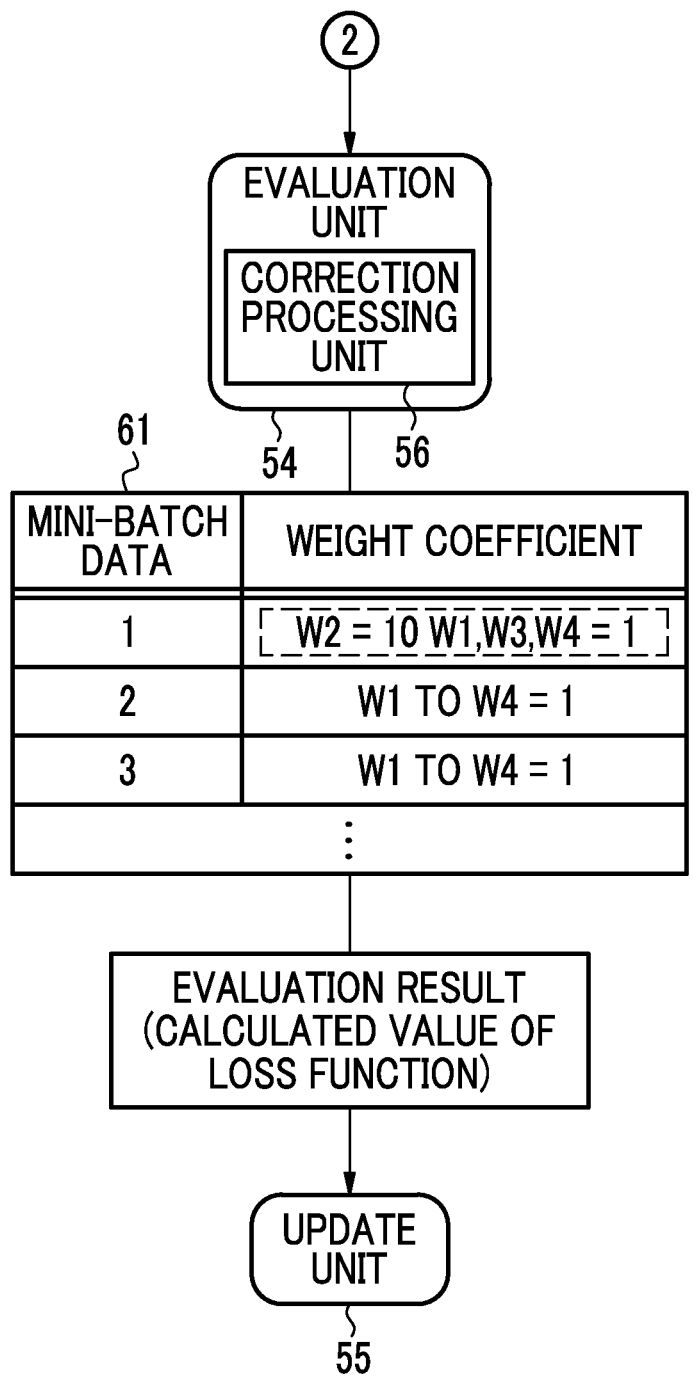
FIG. 11 is a diagram illustrating a specific example of processing of an evaluation unit.
Figure 13:
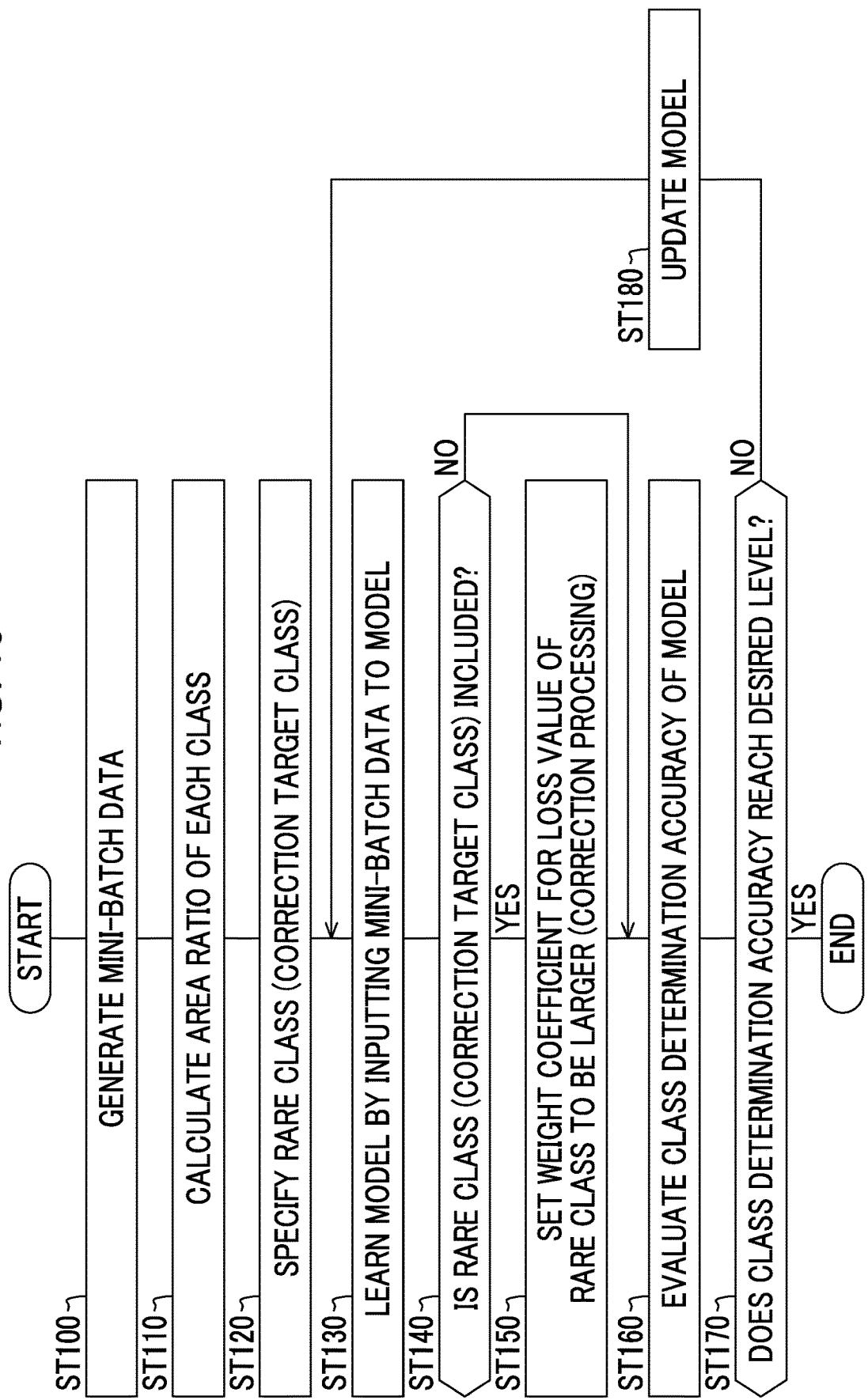
FIG. 13 is a flowchart illustrating a processing procedure of the mini-batch learning apparatus.

FIGS. 10 and 11 illustrate specific examples of processing of each unit of the calculation unit 51, the specifying unit 52, and the evaluation unit 54 (correction processing unit 56), First, in FIG. 10, as shown in a table 60, the calculation unit 51 calculates the area ratio of each class for each set 1, 2, 3, . . . of the mini-batch data 11. In FIG. 10, for a first set of the mini-batch data 11, a case where the area ratio of the class-1 differentiated cells is calculated as 38%, the area ratio of the class-2 undifferentiated cells is calculated as 2%, the area ratio of the class-3 medium is calculated as 40%, and the area ratio of the class-4 dead cells is calculated as 20% is exemplified.

The specifying unit 52 specifies a rare class of which the area ratio is lower than the setting value. In FIG. 10, assuming that the setting value is 5%, for the first set of the mini-batch data 11, a case where the class-2 undifferentiated cells of which the area ratio is 2% lower than the setting value are specified as a rare class is exemplified. In FIG. 10, a case where only one rare class is specified is exemplified. On the other hand, in a case where there are a plurality of classes of which the area ratio is lower than the setting value, naturally, the plurality of classes are specified as rare classes.

Subsequently, in FIG. 11, as shown in a table 61, the correction processing unit 56 of the evaluation unit 54 sets, for a first se of the mini-batch data 11, the weight coefficients WK for the loss values F(TK, PK) of classes 1, 3, and 4 other than the rare class to 1, and sets, for a second set and a third set of the mini-batch data 11, the weight coefficients WK for the loss values F(TK, PK) of classes other than the rare class, such as all classes, to 1. On the other hand, the correction processing unit 56 sets, for the first set of the mini-batch data 11, the weight coefficient WK for the loss value F(TK, PK) of the rare class such as the class 2 to 10.

FIG. 12 illustrates a table in which the loss values F(TK, PK) of each class and the calculated value of the loss function L(TN, PN) are included. The table 65A of (a) of FIG. 12 illustrates a case where the weight coefficient WK for the loss value F(TK, PK) of each class is uniformly set to 1. On the other hand, the table 65B of (b) of FIG. 12 illustrates a case where the weight coefficient WK for the loss value F(TK, PK) of the rare class is set to be larger. In the table, a case where the rare class corresponds to the class-2 undifferentiated cells, the loss value F(T2, P2) of the class 2 is 2, and the loss values F(T1, P1), F(T3, P3), and F(T4, P4) of the other classes 1, 3, and 4 are respectively 25, 20, and 15 is exemplified.

As described above, the loss value F(TK, PK) of the rare class is smaller than the loss value MX, PK) of the class other than the rare class. This difference is caused because the rare class has a limited opportunity in learning of the model 10 as compared with the other classes, and in learning in which one set of the mini-batch data 11 (called an epoch) is input, a degree of improvement or deterioration in the determination accuracy of the model 10 is small.

In a state where there is a large difference in the loss value F(TK, PK) between the rare class and other classes, in a case where the weight coefficients WK are uniformly the same as illustrated in (a) of FIG. 12, an influence of the loss value F(TK, PK) of the rare class on the calculated value (=62) of the loss function L(TN, PN) is relatively small. On the other hand, in a case where the weight coefficient WK for the loss value F(TK, PK) of the rare class is set to be larger as illustrated in (b) of FIG. 12, compared with the case of (a) of FIG. 12, the influence of the loss value MK, PK) of the rare class on the calculated value (=80) of the loss function L(TN, PN) is large. By setting the weight coefficient WK for the loss value F(TK, PK) of the rare class to be larger in this way, the evaluation unit 54 evaluates the determination accuracy of the model 10 by increasing the loss value F(TK, PK) of the rare class to a value comparable to the loss value F(TK, PK) of the class other than the rare class and calculating the loss function L(TN, PN).

Next, an operation according to the configuration will be described with reference to a flowchart illustrated in FIG.

13, First, in a case where the operation program 40 is started, as illustrated in FIG. 9, the CPU 32 of the computer including the mini-batch learning apparatus 2 functions as each of the processing units 50 to 56.

The mini-batch data 11 is generated by the generation unit 50 (step ST100). The mini-batch data 11 is output from the generation unit 50 to the calculation unit 51, the learning unit 53, and the evaluation unit 54.

As shown in the table 60 of FIG. 10, the calculation unit 51 calculates the area ratio of each class for each set of the mini-batch data 11 (step ST110, calculation step). Subsequently, as illustrated in FIG. 10, as a correction target class, a rare class of which the area ratio is lower than the setting value is specified by the specifying unit 52 (step ST120, specifying step).

The model 10 is learned by the learning unit 53 by inputting, to the model 10, the divided learning input image group 1 of the mini-batch data 11 generated from the generation unit 50 (step ST130).

In a case where the mini-batch data 11 which is input to the model 10 in step ST130 includes a rare class (YES in step ST140), as shown in the table 61 of FIG. 11 and the table 65B of (b) of FIG. 12, the correction processing unit 56 sets the weight coefficient WK for the loss value F(TK, PK) of the rare class to be larger than the weight coefficient WK for the loss value F(TK, PK) of the class other than the rare class (step ST150, correction processing step). On the other hand, in a case where the mini-batch data 11 which is input to the model 10 in step ST130 does not include a rare class (NO in step ST140), the correction processing unit 56 sets the weight coefficient WK for the loss value F(TK, PK) of the rare class not to be larger but to be a normal weight coefficient WK.

The evaluation unit 54 evaluates the class determination accuracy of the model 10 by comparing the learning output image group 14 output from the model 10 with the divided annotation image group 13 of the mini-batch data 11 from the generation unit 50 (step ST160, evaluation step). More specifically, the loss value F(TK, PK) is calculated for each of the plurality of classes. The product of the loss value F(TK, PK) and the weight coefficient WK which is set in step ST150 or the normal weight coefficient WK is calculated, and a total sum of the products is calculated as a calculated value of the loss function L(TN, PN).

In a case where it is determined that the class determination accuracy of the model 10 reaches a desired level based on the calculated value of the loss function L(TN, PN) by the evaluation unit 54 (YES in step ST170), the mini-batch learning is ended. On the other hand, in a case where it is determined that the class determination accuracy of the model 10 does not reach a desired level (NO in step ST170), the update unit 55 updates the model 10 (step sT180), The process returns to step sT130, another set of the mini-batch data 11 is input to the model 10, and the subsequent steps are repeated.

The case where the rare class is specified by the specifying unit 52 is a case where there is a class bias in the mini-batch data 11. In the mini-batch data 11 in which there is a class bias, learning is performed without taking into account a rare class. More specifically, a frequency of learning of the rare class is relatively lower than a frequency of learning of other classes. After biased learning is performed, in a case where the determination accuracy of the model 10 without any restrictions is evaluated by the evaluation unit 54, as illustrated in (a) of FIG. 12, an evaluation result in which the rare class is not taken into account is output. In this case, in the subsequent update of the model 10, the rare class is not taken into account. As a result, the model TO having a low rare class determination accuracy is obtained.

On the other hand, in the present embodiment, as described above, the correction processing unit 56 executes correction processing based on the comparison result of the loss value F(TK, PK) of the rare class and the loss value F(TK, PK) of the class other than the rare class. More specifically, the correction processing unit 56 sets the weight coefficient WK for the loss value F(TK, PK) of the rare class to be larger than the weight coefficient WK for the loss value F(TK, PK) of the class other than the rare class. Thereby, the evaluation result in which the rare class is sufficiently taken into account can be output, and the subsequent update of the model 10 also tends to improve the rare class determination accuracy. Therefore, it is possible to avoid a situation in which the model 10 having a low rare class determination accuracy is obtained, and it is possible to prevent a decrease in the class determination accuracy of the model 10.

Figure 14:
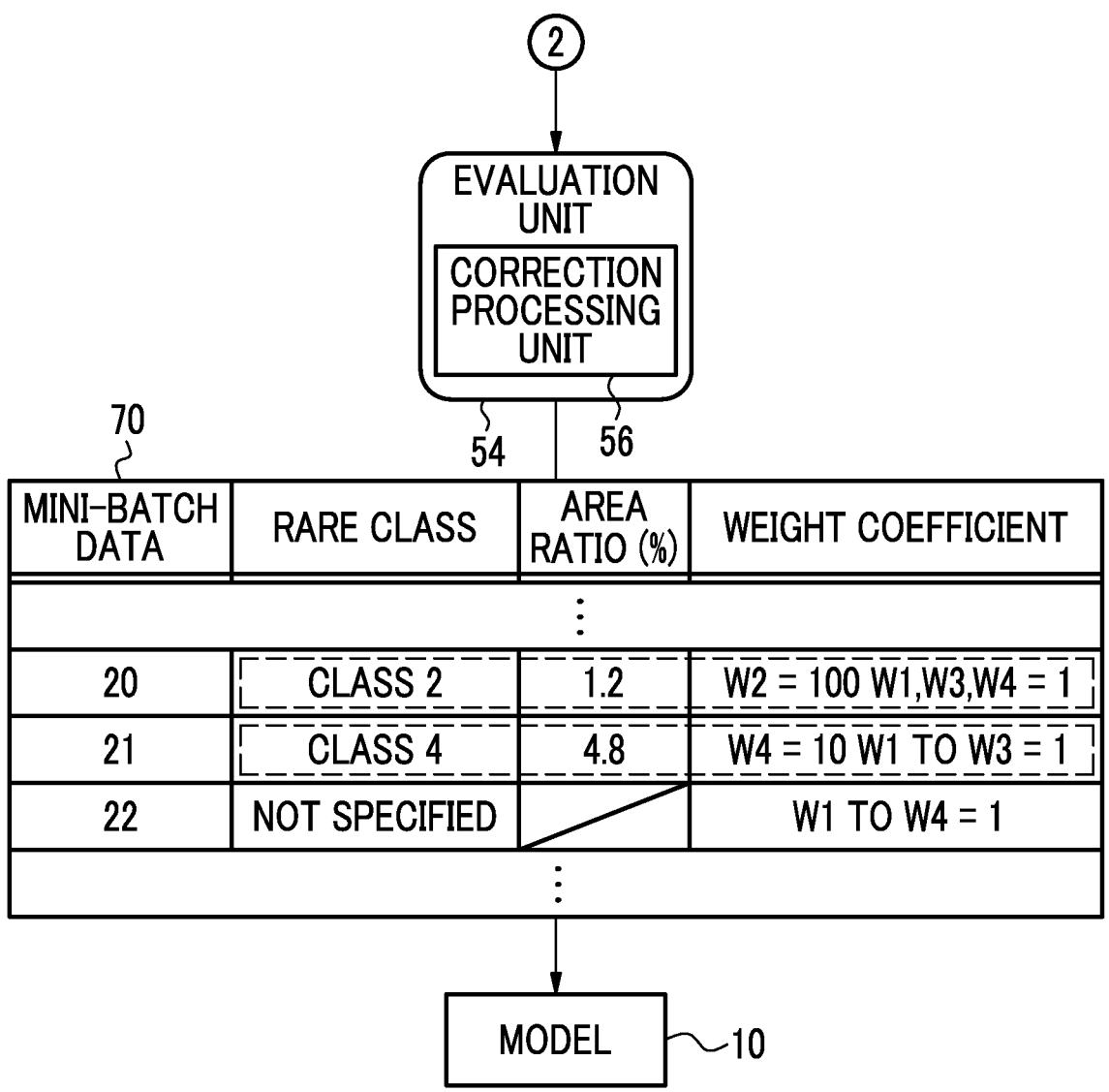
FIG. 14 is a diagram illustrating a modification example of processing of the evaluation unit.

As the area ratio is lower, a degree to which the weight coefficient WK for the loss value F(TK, PK) of the rare class is set to be larger may be increased. For example, as shown in a table 70 of FIG. 14, in a case where the area ratio is equal to or higher than 0% and lower than 2.5% as in the 20th set of the mini-batch data 11, the weight coefficient W2 of the class 2 as a rare class is set to 100. On the other hand, in a case where the area ratio is equal to or higher than 2.5% and lower than 5% as in the 21st set of the mini-batch data 11, the weight coefficient W4 of the class 4 as a rare class is set to 10. It is considered that the loss value F(TK, PK) is smaller as the area ratio is lower. Therefore, the weight coefficient WK is changed according to the area ratio in this way, and thus the evaluation result in which the rare class is taken into account can be output. Thereby, it is possible to prevent a decrease in the class determination accuracy of the model 10.

Second Embodiment

Figure 15:
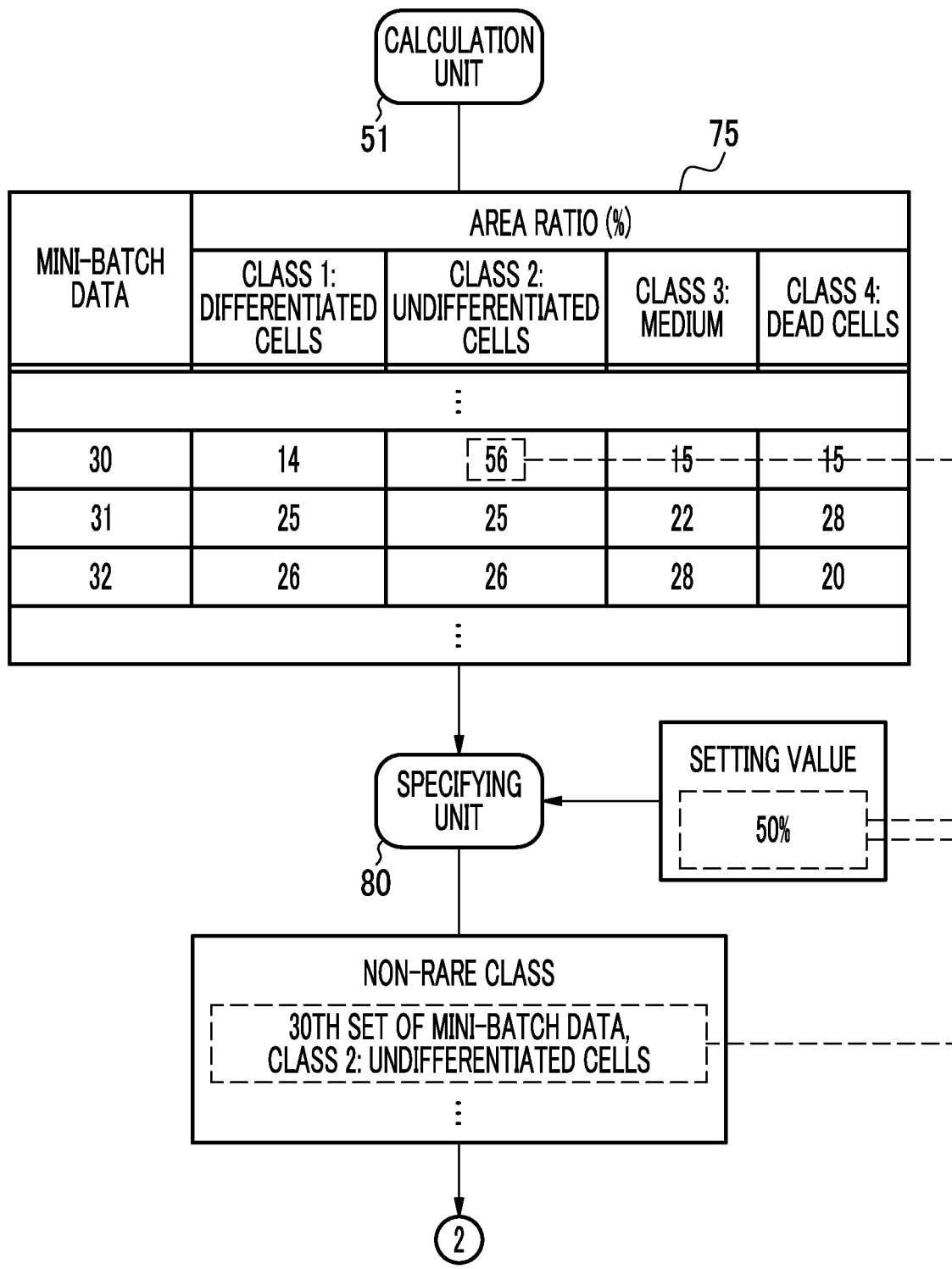
FIG. 15 is a diagram illustrating a specific example of processing of the calculation unit and the specifying unit according to a second embodiment.
Figure 16:
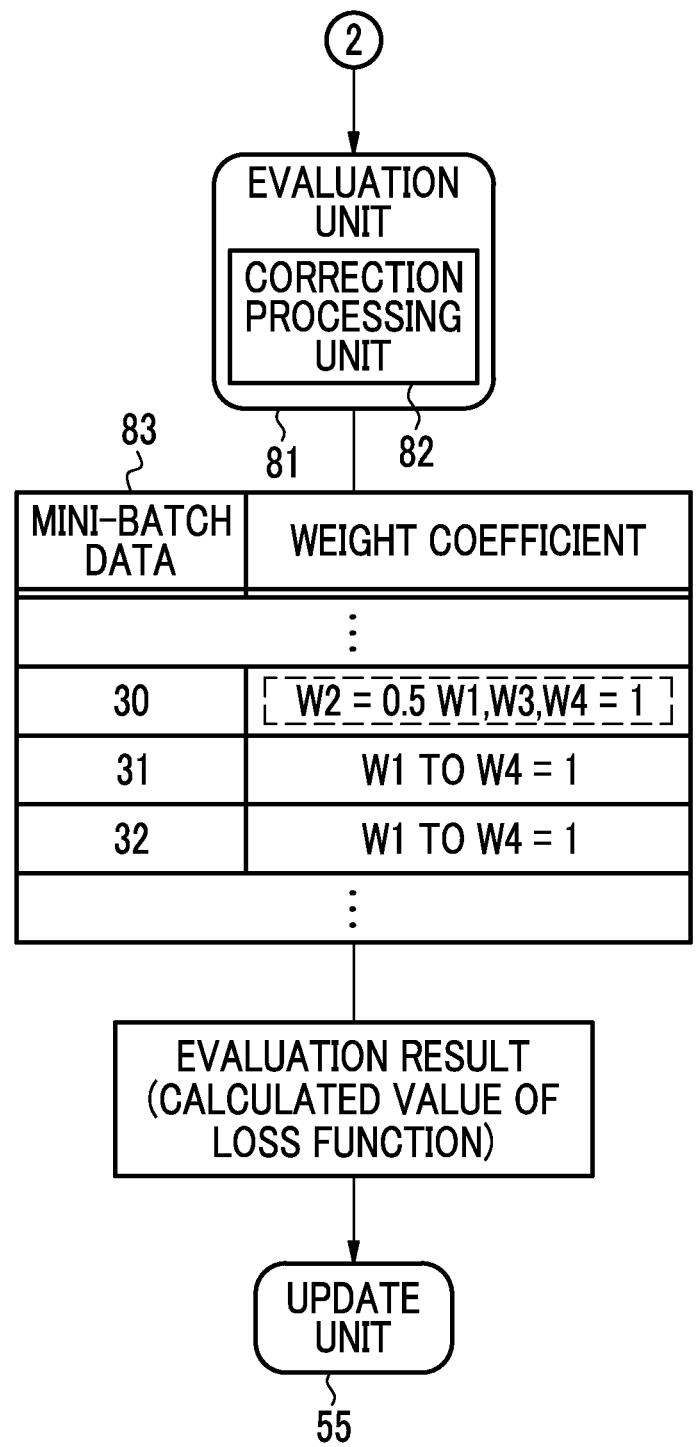
FIG. 16 is a diagram illustrating a specific example of processing of the evaluation unit according to the second embodiment.
Figure 17:
FIG. 17 is a diagram illustrating a table according to the second embodiment in which a loss value of each class and a calculated value of a loss function are included, (a) of FIG. 17 illustrates a case where a weight for the loss value of each class is the same, and (b) of FIG. 17 illustrates a case where the weight for the loss value of a non-rare class is set to be smaller than the weight for the loss value of a class other than the non-rare class.

In a second embodiment illustrated in FIGS. 15 to 17, contrary to the first embodiment, a non-rare class of which the area ratio is higher than a setting value which is set in advance is specified as a correction target class, and processing of setting the weight for the first loss value to be smaller than the weight for the second loss value is executed as correction processing.

In FIG. 15, the specifying unit 80 according to the present embodiment specifies, as a correction target class, a non-rare class of which the area ratio is higher than a setting value. In FIG. 15, assuming that the setting value is 50%, as shown in a table 75, for the 30th set of the mini-batch data 11, a case where the class-2 undifferentiated cells of which the area ratio is 56% higher than the setting value are specified as a non-rare class is exemplified. As in the rare class according to the first embodiment, a plurality of classes may be specified as non-rare classes.

In FIG. 16, the correction processing unit 82 of the evaluation unit 81 according to the present embodiment executes, as the correction processing, processing of setting the weight coefficient WK for the loss value F(TK, PK) of the non-rare class to be smaller than the weight coefficient WK for the loss value F(TK, PK) of the class other than the non-rare class. Specifically, as shown in a table 83, the correction processing unit 82 of the evaluation unit 81 sets, for the 30th set of the mini-batch data 11, the weight coefficients WK for the loss values MX, PK) of classes 1, 3, and 4 other than the non-rare class to 1, and sets, for the 31st set and the 32nd set of the mini-batch data 11, the weight coefficients WK for the loss values F(TK, PK) of classes other than the non-rare class, such as all classes, to 1. On the other hand, the correction processing unit 82 sets, for the 30th set of the mini-batch data 11, the weight coefficient WK for the loss value F(TK, PK) of the non-rare class such as the class 2 to 0.5.

As in FIG. 12, FIG. 17 illustrates a table in which the loss values F(TK, PK) of each class and the calculated value of the loss function L(TN, PN) are included. The table 85A of (a) of FIG. 17 illustrates a case where the weight coefficient WK for the loss value F(TK, PK) of each class is uniformly set to 1. On the other hand, the table 85B of (11) of FIG. 17 illustrates a case where the weight coefficient WK for the loss value F(TK, PK) of the non-rare class is decreased. In the table, a case where the non-rare class corresponds to the class-2 undifferentiated cells, the loss value F(T2, P2) of the class 2 is 42, and the loss values F(T1, P1), F(T3, P3), and F(T4, P4) of the other classes 1, 3, and 4 are respectively 19, 22, and 18 is exemplified.

Contrary to the first embodiment, the loss value F(TK, PK) of the non-rare class is larger than the loss value F(TK, PK) of the class other than the non-rare class. The evaluation unit 81 sets the weight coefficient WK for the loss value F(TK, PK) of the non-rare class to be smaller. Thereby, as illustrated in (b) of FIG. 17, the loss value F(TK, PK) of the non-rare class is decreased to a value comparable to the loss value F(TK, PK) of the class other than the non-rare class, and compared with the case of (a) of FIG. 17 in which the weight coefficients WK are uniformly set to the same value, the influence of the loss value F(TK, PK) of the non-rare class on the calculated value of the loss function L(TN, PN) is small.

As described above, in the second embodiment, the non-rare class of which the area ratio is higher than the setting value is specified as the correction target class, and processing of setting the weight for the first loss value to be smaller than the weight for the second loss value is executed as the correction processing. Therefore, as in the first embodiment, it is possible to prevent a decrease in the class determination accuracy of the model 10.

In this case, similar to the first embodiment, as the area ratio is higher, a degree to which the weight coefficient WK for the loss value F(TK, PK) of the non-rare class is set to be smaller may be increased.

Third Embodiment in a third embodiment illustrated in FIGS. 18 to 21, a rare class of which the area ratio is lower than a setting value which is set in advance is specified as a correction target class, and enlargement processing of setting a correct answer value and a predicted value in calculation of the first loss value to be larger than a correct answer value and a predicted value in calculation of the second loss value is executed as correction processing.

Figure 18:
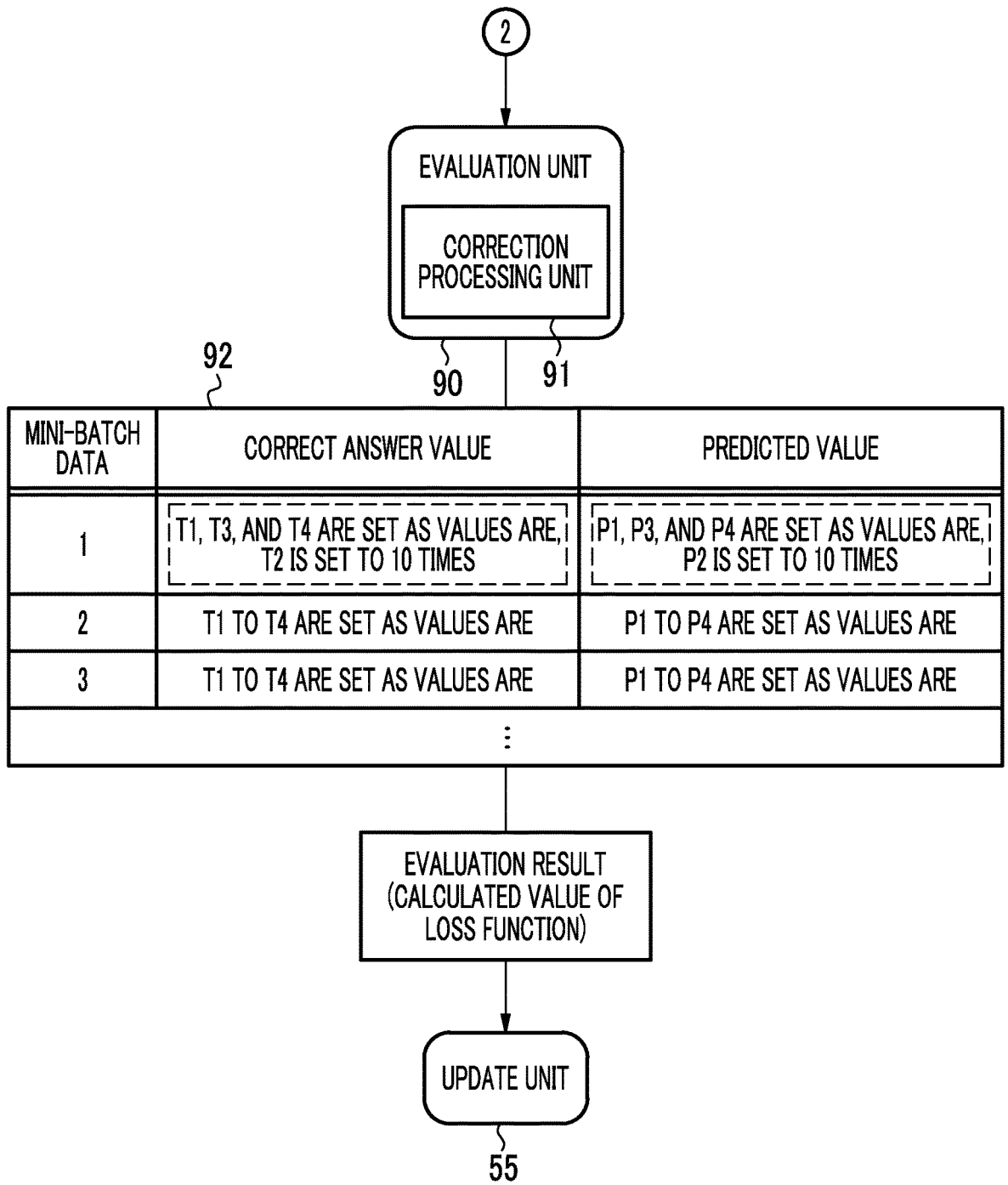
FIG. 18 is a diagram illustrating a specific example of processing of the evaluation unit according to a third embodiment.

In FIG. 18, as illustrated in FIG. 10, for the first set of the mini-batch data 11, a case where the class-2 undifferentiated cells are specified as a rare class is exemplified. In this case, as shown in a table 92, the correction processing unit 91 of the evaluation unit 90 according to the present embodiment sets, for a first set of the mini-batch data 11, correct answer values and predicted values of classes 1, 3, and 4 other than the rare class as the values are, and sets, for a second set and a third set of the mini-hatch data 11, correct answer values and predicted values of classes other than the rare class, such as all classes, as the values are. On the other hand, the correction processing unit 91 executes, for the first set of the mini-batch data 11, enlargement processing of multiplying a correct answer value and a predicted value of the rare class such as the class 2 by 10.

Figure 19:
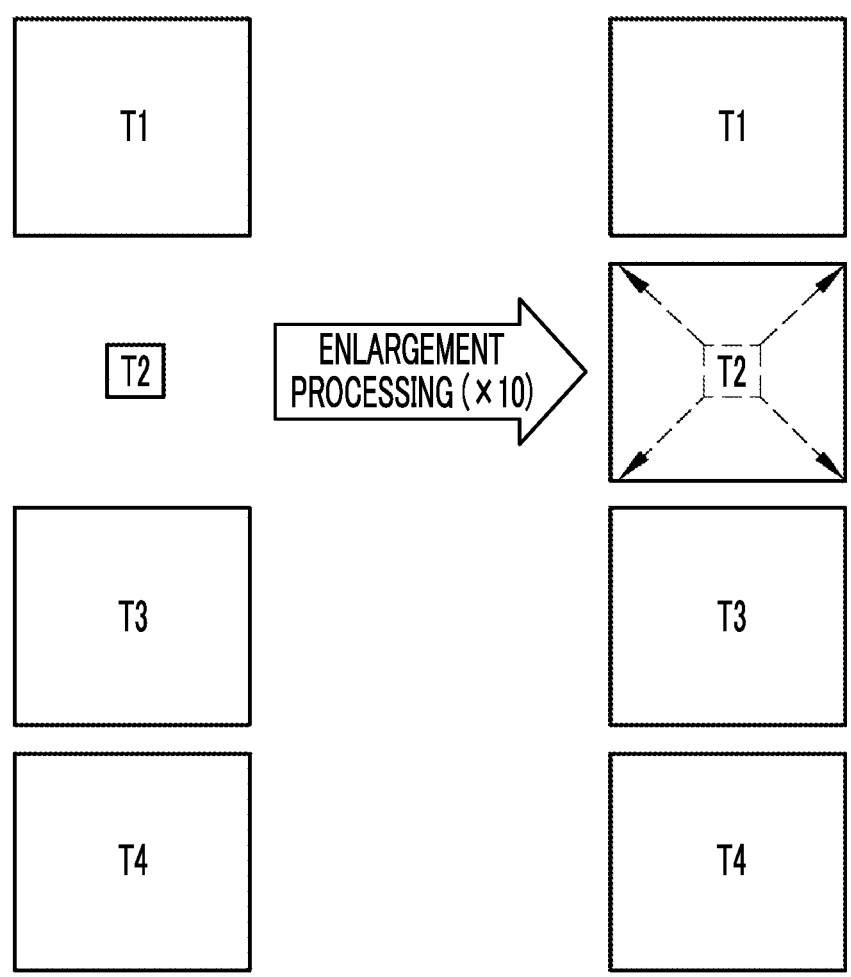
FIG. 19 is a diagram conceptually illustrating processing of the evaluation unit according to the third embodiment.
Figure 20:
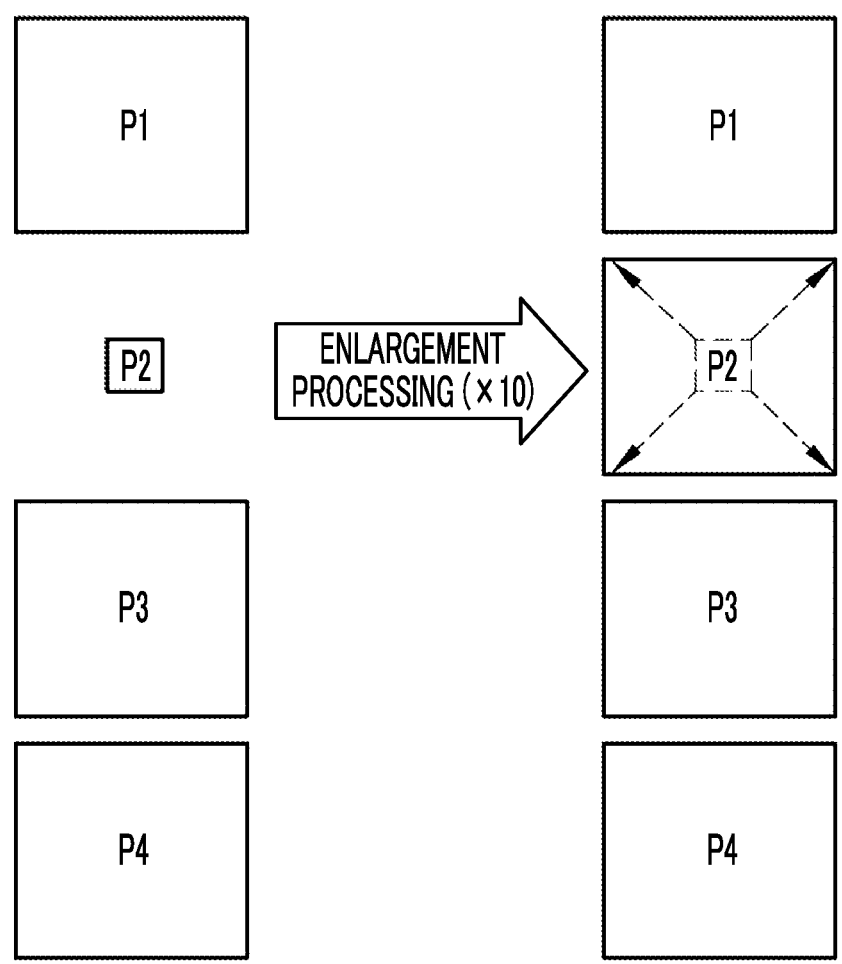
FIG. 20 is a diagram conceptually illustrating processing of the evaluation unit according to the third embodiment.

FIGS. 19 and 20 are diagrams conceptually illustrating enlargement processing of multiplying, for the first set of the mini-batch data 11 of FIG. 18, the correct answer value and the predicted value of the class 2 by 10. As illustrated in FIG. 19, by the enlargement processing, the correct answer value T2 is set to 10 times the correct answer value before the enlargement processing. Similarly, as illustrated in FIG. 20, by the enlargement processing, the predicted value P2 is set to 10 times the predicted value before the enlargement processing. As described above, the enlargement processing is processing of increasing the number of target pixels of the correct answer value of the rare class and the number of target pixels of the predicted value of the rare class.

As shown in a table 95 of FIG. 21, the correction processing unit 91 sets an enlargement ratio in the enlargement processing such that the area ratio of the rare class in the mini-batch data 11 is the same value as the area ratio of the rare class in the learning input image 20 and the annotation image 21 which are sources of the mini-batch data 11. In FIG. 21, for the first set of the mini-hatch data 11, a case where the class-2 undifferentiated cells are specified as a rare class, the area ratio of the rare class in the mini-batch data 11 is 2%, and the area ratio of the rare class in the learning input image 20 and the annotation image 21 is 20% is exemplified. In this case, the correction processing unit 91 sets the enlargement ratio in the enlargement processing to 20/2=10 times. Processing of setting the area ratios to the same value includes not only processing of setting the area ratio of the rare class in the mini-batch data 11 and the area ratio of the rare class in the learning input image 20 and the annotation image 21 to completely the same value, but also processing of setting the area ratio of the rare class in the mini-batch data 11 and the area ratio of the rare class in the learning input image 20 and the annotation image 21 to be within a defined error range, for example, +10%.

As described above, in the third embodiment, a rare class of which the area ratio is lower than a setting value which is set in advance is specified as a correction target class, and enlargement processing of setting a correct answer value and a predicted value in calculation of the first loss value to be larger than a correct answer value and a predicted value in calculation of the second loss value is executed as correction processing. By the correction processing, imbalance in the loss values F(TK, PK) of the rare class and the non-rare class can be corrected. Therefore, it is possible to prevent a decrease in the class determination accuracy of the model 10. Further, the correction processing is effective in a case where the loss values F(TK, PK) do not correspond to a linear function.

Further, in the third embodiment, an enlargement ratio in the enlargement processing is set such that the area ratio of the rare class in the mini-batch data 11 is the same value as the area ratio of the rare class in the learning input image 20 and the annotation image 21. Therefore, the enlargement ratio can be set to an appropriate value. Preferably, in a case where there is no bias in the area ratio of each class in the learning input image 20 and the annotation image 21, the enlargement ratio determination method is adopted.

The case where there is no bias in the area ratio of each class in the learning input image 20 and the annotation image 21 is, for example, a case where a difference between a maximum value and a minimum value of the area ratio of each class is within 10%.

Fourth Embodiment

In a fourth embodiment illustrated in FIGS. 22 to 25, contrary to the third embodiment, a non-rare class of which the area ratio is higher than a setting value which is set in advance is specified as a correction target class, and reduction processing of setting a correct answer value and a predicted value in calculation of the first loss value to be smaller than a correct answer value and a predicted value in calculation of the second loss value is executed as correction processing.

Figure 22:
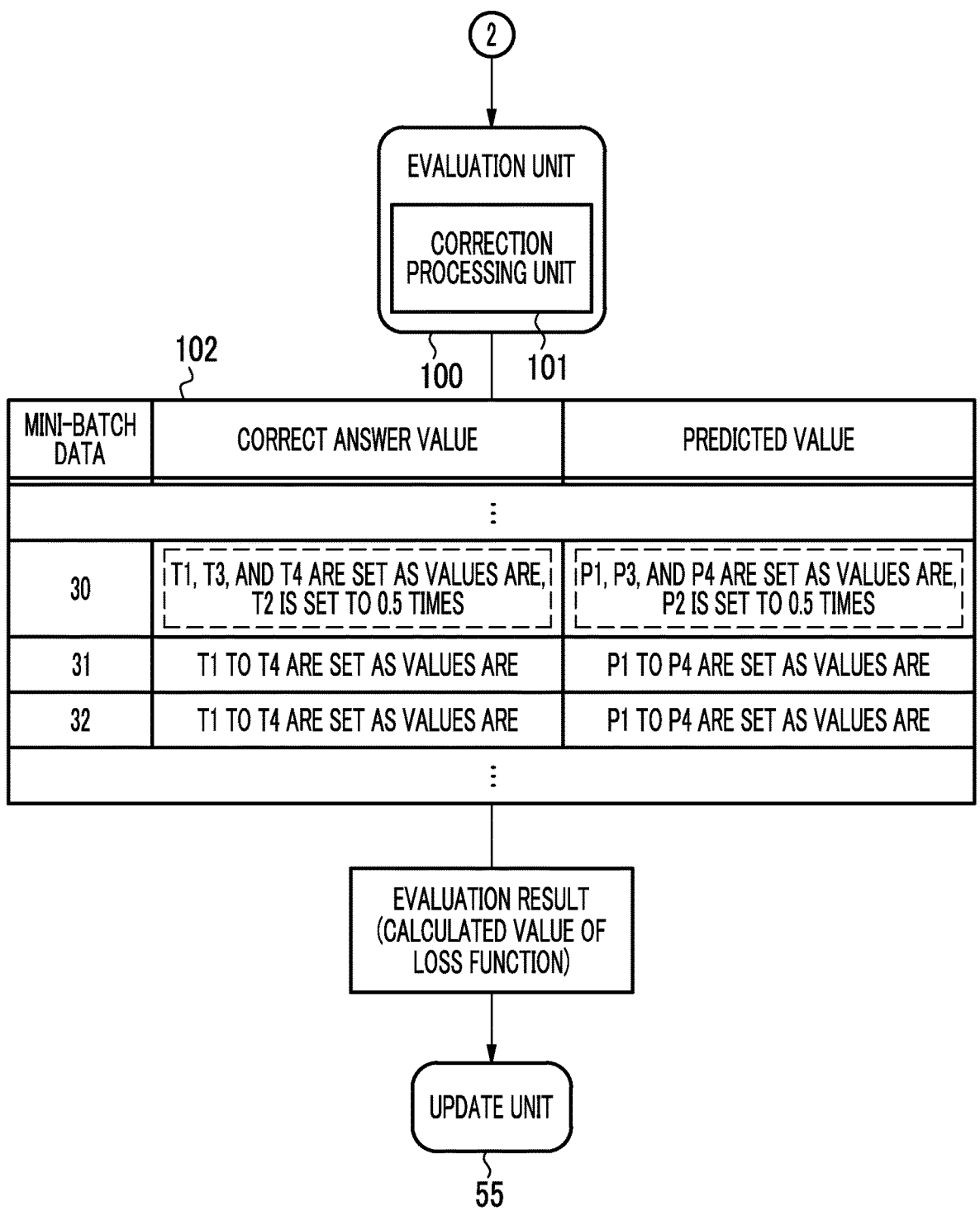
FIG. 22 is a diagram illustrating a specific example of processing of the evaluation unit according to a fourth embodiment.
Figure 23:
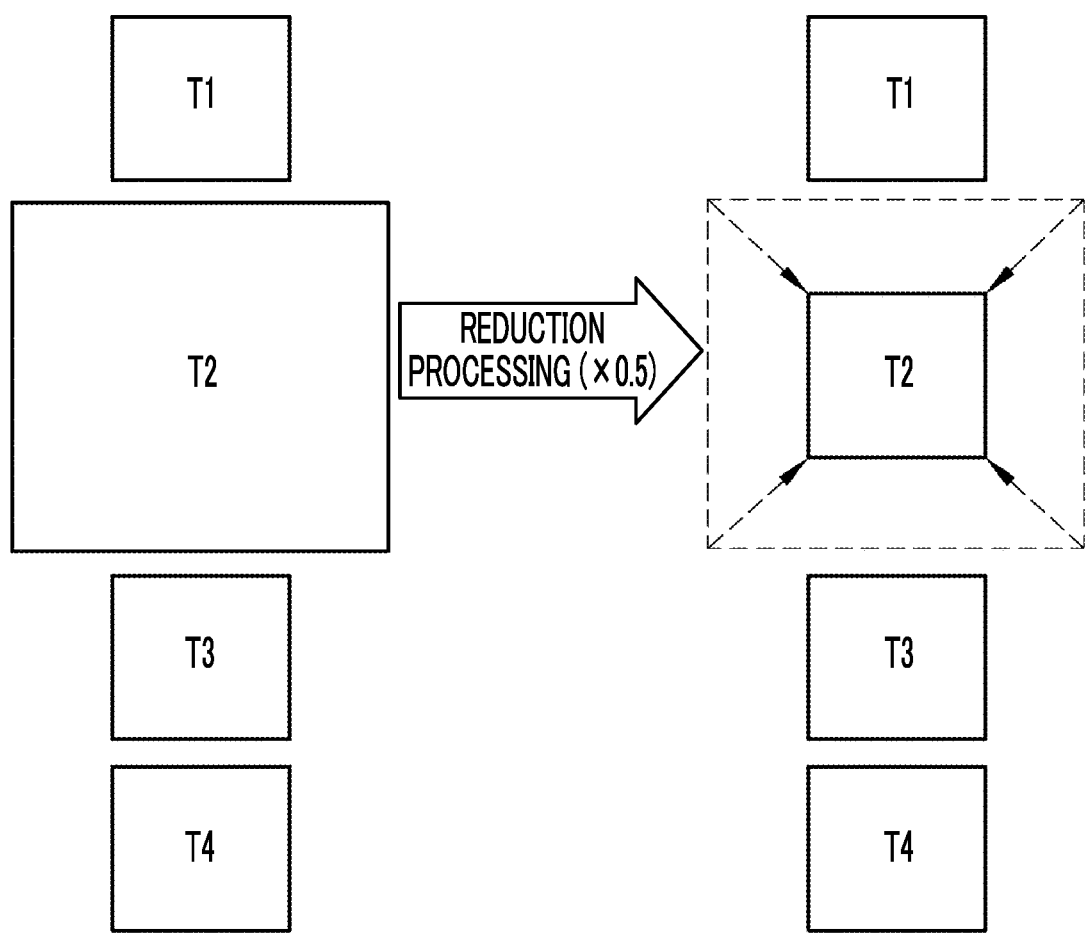
FIG. 23 is a diagram conceptually illustrating processing of the evaluation unit according to the fourth embodiment.
Figure 24:
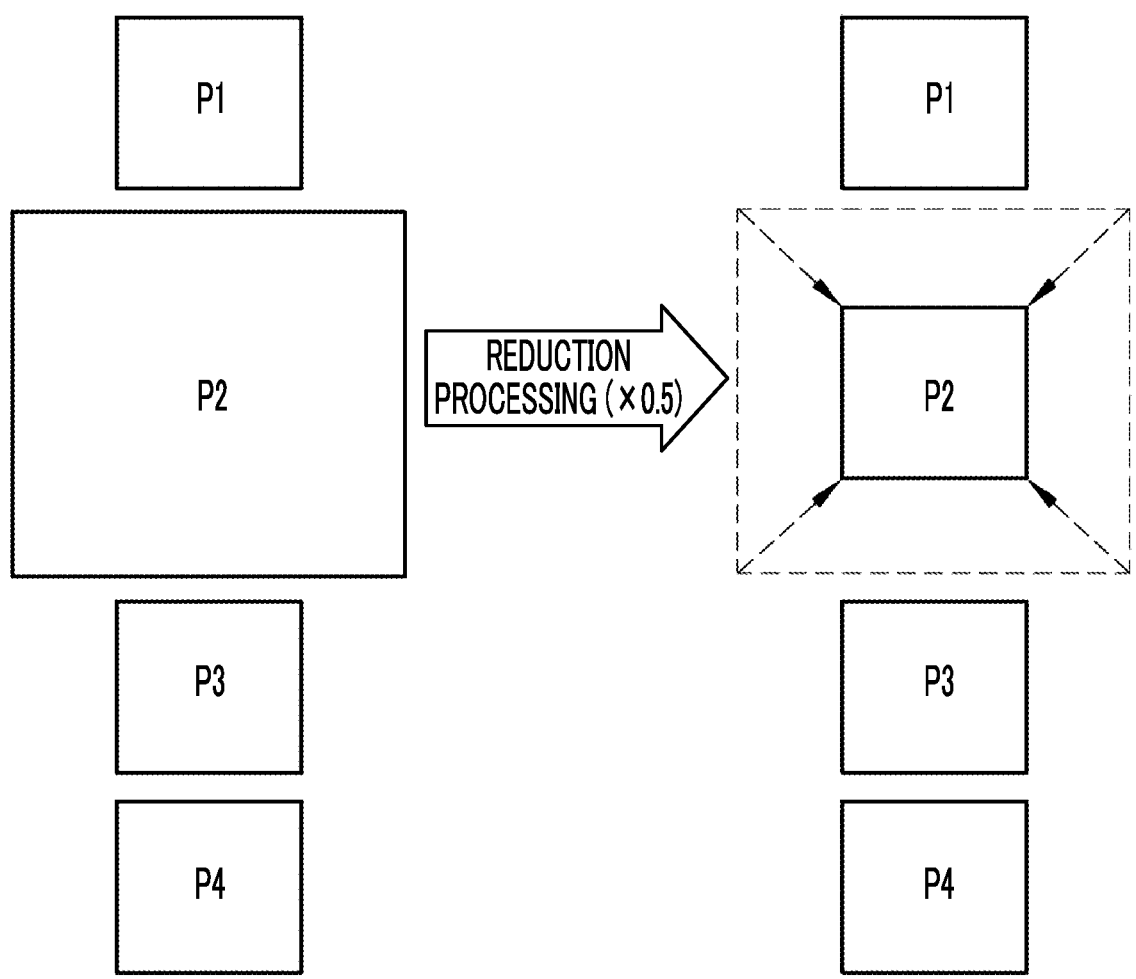
FIG. 24 is a diagram conceptually illustrating processing of the evaluation unit according to the fourth embodiment.

In FIG. 22, as illustrated in FIG. 15, for a 30th set of the mini-batch data 11, a case where the class-2 undifferentiated cells are specified as a non-rare class is exemplified. In this case, as shown in a table 102, the correction processing unit 101 of the evaluation unit 100 according to the present embodiment sets, for a 30th set of the mini-batch data 11, correct answer values and predicted values of classes 1, 3, and 4 other than the non-rare class as the values are, and sets, for a 31st set and a 32nd set of the mini-batch data 11, correct answer values and predicted values of classes other than the non-rare class, such as all classes, as the values are. On the other hand, the correction processing unit 101 executes, for the 30th set of the mini-batch data 11, reduction processing of multiplying a correct answer value and a predicted value of the non-rare class such as the class 2 by 0.5, FIGS. 23 and 24 are diagrams conceptually illustrating reduction processing of multiplying, for the 30th set of the mini-batch data 11 of FIG. 22, the correct answer value and the predicted value of the class 2 by 0.5. As illustrated in FIG. 23, by the reduction processing, the correct answer value T2 is set to 0.5 times the correct answer value before the reduction processing. Similarly, as illustrated in FIG. 24, by the reduction processing, the predicted value P2 is set to 0.5 times the predicted value before the reduction processing. As described above, contrary to the enlargement processing according to the third embodiment, the reduction processing is processing of decreasing the number of target pixels of the correct answer value of the non-rare class and the number of target pixels of the predicted value of the non-rare class.

As shown in a table 105 of FIG. 25, the correction processing unit 101 sets a reduction ratio in the reduction processing such that the area ratio of the non-rare class in the mini-batch data 11 is the same value as the area ratio of the non-rare class in the learning input image 20 and the annotation image 21 which are sources of the mini-batch data 11. In FIG. 25, for the 30th set of the mini-hatch data 11, a case where the class-2 undifferentiated cells are specified as a non-rare class, the area ratio of the non-rare class in the mini-batch data 11 is 56%, and the area ratio of the non-rare class in the learning input image 20 and the annotation image 21 is 28% is exemplified. In this case, the correction processing unit 101 sets the reduction ratio in the reduction processing to 28/56=0.5 times. Even in this case, similar to the third embodiment, processing of setting the area ratios to the same value includes not only processing of setting the area ratio of the rare class in the mini-batch data 11 and the area ratio of the rare class in the learning input image 20 and the annotation image 21 to completely the same value, but also processing of setting the area ratio of the rare class in the mini-batch data 11 and the area ratio of the rare class in the learning input image 20 and the annotation image 21 to be within a defined error range, for example, ±10%.

As described above, in the fourth embodiment, a non-rare class of which the area ratio is higher than a setting value which is set in advance is specified as a correction target class, and reduction processing of setting a correct answer value and a predicted value in calculation of the first loss value to be smaller than a correct answer value and a predicted value in calculation of the second loss value is executed as correction processing. Therefore, as in the third embodiment, it is possible to prevent a decrease in the class determination accuracy of the model 10. Further, as in the third embodiment, the correction processing is effective in a case where the loss values MK, PK) do not correspond to a linear function.

Further, in the fourth embodiment, a reduction ratio in the reduction processing is set such that the area ratio of the non-rare class in the mini-batch data 11 is the same value as the area ratio of the non-rare class in the learning input image 20 and the annotation image 21. Therefore, the reduction ratio can be set to an appropriate value. Preferably, as in the third embodiment, in a case where there is no bias in the area ratio of each class in the teaming input image 20 and the annotation image 21, the reduction ratio determination method is adopted.

Fifth Embodiment

Figure 26:
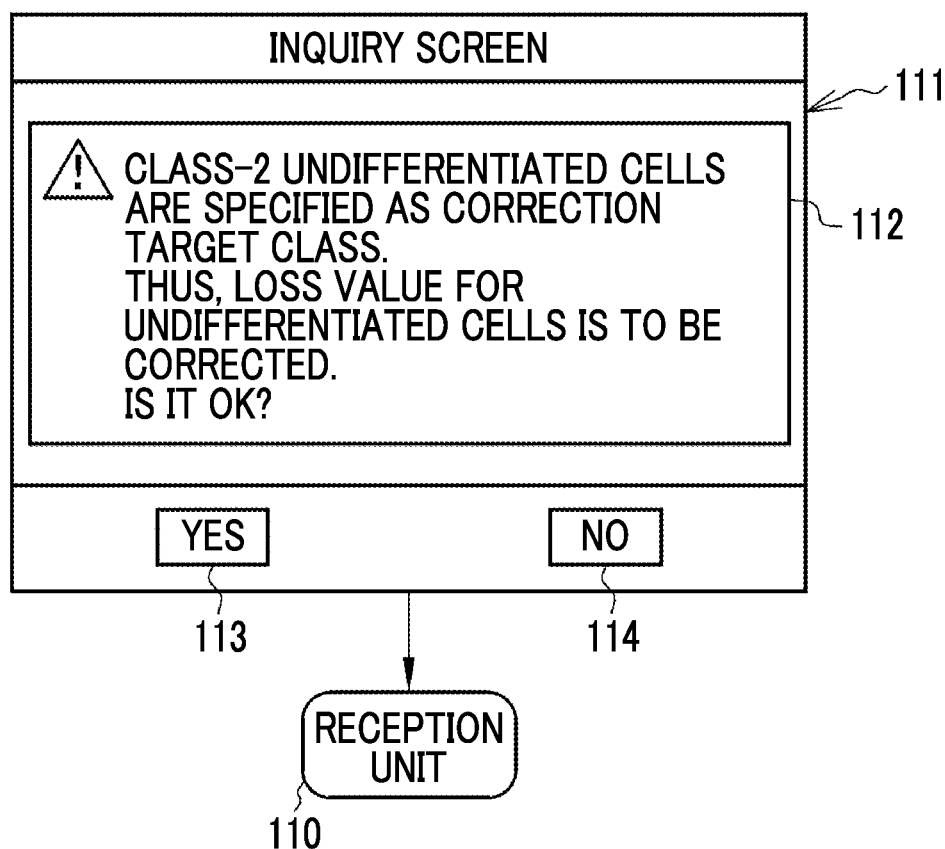
FIG. 26 is a diagram illustrating a fifth embodiment for inquiring whether or not to cause a correction processing unit to execute correction processing.

In a fifth embodiment illustrated in FIG. 26, whether or not to cause the correction processing unit to execute the correction processing is inquired.

In FIG. 26, the CPU of the mini-batch learning apparatus according to the fifth embodiment functions as a reception unit 110 in addition to each processing unit according to each embodiment. In a case where the correction target class is specified by the specifying unit 52, the reception unit 110 receives a selection instruction as to whether or not to cause the correction processing unit to execute the correction processing.

In the fifth embodiment, in a case where the correction target class is specified by the specifying unit 52, an inquiry screen 111 is displayed on the display 34. On the inquiry screen 111, a message 112 indicating that the correction target class is specified and inquiring whether or not to execute the correction processing of correcting the loss value of the correction target class, a Yes button 113, and a No button 114 are displayed. The reception unit 110 receives a selection instruction of the Yes button 113 and the No button 114, as a selection instruction as to whether or not to execute the correction processing. In a case where the Yes button 113 is selected, the correction processing unit executes the correction processing. On the other hand, in a case where the No button 114 is selected, the correction processing unit does not execute the correction processing.

In generation of the annotation image, since the class is manually designated, the class may be incorrectly designated. Further, although classes are designated in early stage of development of the model 10, some classes may become less important as the development progresses. In such a case, although the correction target class is specified 1w the specifying unit 52, it may not be necessary to execute the correction processing.

For this reason, in the fifth embodiment, the reception unit 110 receives a selection instruction as to whether or not to cause the correction processing unit to execute the correction processing. Therefore, in a case where the correction target class is specified by the specifying unit 52 but it may not be necessary to execute the correction processing, it is possible to deal with the case.

The first embodiment and the second embodiment may be applied by being combined with each other. That is, the weight coefficient for the loss value of the rare class may be set to be smaller than the weight coefficient for the loss value of the class other than the rare class, and the weight coefficient for the loss value of the non-rare class may be set to be larger than the weight coefficient for the loss value of the class other than the non-rare class. Similarly, the third embodiment and the fourth embodiment may be applied by being combined with each other. That is, the correct answer value and the predicted value in calculation of the loss value of the rare class may be set to be larger than the correct answer value and the predicted value in calculation of the loss value of the class other than the rare class, and the correct answer value and the predicted value in calculation of the loss value of the non-rare class may be set to be smaller than the correct answer value and the predicted value in calculation of the loss value of the class other than the non-rare class.

In each embodiment, phase-contrast-microscope images in which a state of cell culture appears are exemplified as the input image 16 and the learning input image 20, and the differentiated cells and the medium are exemplified as the classes. On the other hand, the present disclosure is not limited thereto. For example, magnetic resonance imaging (MRI) images may be used as the input image 16 and the learning input image 20, and organs such as a liver and a kidney may be used as the classes.

The model 10 is not limited to U-Net, and may be another convolutional neural network, for example, SegNet.

The hardware configuration of the computer including the mini-batch learning apparatus 2 may be modified in various ways. For example, the mini-batch learning apparatus 2 may be configured by a plurality of computers which are separated as hardware for the purpose of improving processing capability and reliability. Specifically, the functions of the generation unit 50, the calculation unit 51, and the specifying unit 52, and the functions of the learning unit 53, the evaluation unit 54, and the update unit 55 may be distributed to two computers. In this case, the mini-batch learning apparatus 2 is configured with two computers.

In this way, the hardware configuration of the computer may be appropriately changed according to the required performance such as processing capability, safety, and reliability. Further, not only hardware but also the application program such as an operation program 40 may be duplicated or distributed and stored in a plurality of storage devices for the purpose of ensuring safety and reliability.

In each embodiment, for example, as a hardware structure of the processing unit that executes various processing such as pieces of processing by the generation unit 50, the calculation unit 51, the specifying unit 52 or 80, the learning unit 53, the evaluation unit 54, 81, 90, or 100, the update unit 55, the correction processing unit 56, 82, 91, or 101, and the reception unit 110, the following various processors may be used. The various processors include, as described above, a central processing unit (CPU) which is a general-purpose processor that functions as various processing units by executing software (an operation program 40), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above; the various processing units are configured by using one or more various processors as a hardware structure.

Further, as the hardware structure of the various processors, more specifically, an electric circuit (circuitry) in which circuit elements such as semiconductor elements are combined may be used.

From the above description, the invention described in following Appendix 1 can be understood.

[Appendix 1]

A mini-batch learning apparatus that learns a machine learning model for performing semantic segmentation, which determines a plurality of classes in an image in units of pixels, by inputting mini-batch data to the machine learning model, the apparatus including:

a calculation processor configured to calculate an area ratio of each of the plurality of classes in the mini-batch data;

a specifying processor configured to specify a correction target class based on the area ratio; and an evaluation processor configured to evaluate a determination accuracy of the class of the machine learning model by calculating a loss value for each of the plurality of classes using a loss function and includes a correction processing processor configured to execute correction processing of correcting a first loss value of the correction target class based on a comparison result of the first loss value and a second loss value of a class other than the correction target class.

The technique of the present disclosure can also appropriately combine the various embodiments and the various modification examples. In addition, the technique of the present disclosure is not limited to each embodiment, and various configurations may be adopted without departing from the scope of the present disclosure. Further, the technique of the present disclosure extends to a program and a storage medium for non-temporarily storing the program.

EXPLANATION OF REFERENCES

2: mini-batch learning apparatus
    10: machine learning model (model)
    10T: learned machine learning model (learned model)
    11: mini-batch data
    12: divided learning input image group
    13: divided annotation image group
    14: learning output image group 15: operating apparatus
16: input image
17: output image
20: learning input image
20S: divided learning input image
21: annotation image
21S: divided annotation image
25: frame
30: storage device
31: memory
32: CPU
33: communication unit
34: display
35: input device
36: data bus
40: operation program
50: generation unit
51: calculation unit
52, 80: specifying unit
53: learning unit
54, 81, 90, 100: evaluation unit
55: update unit
56, 82, 91, 101: correction processing unit
60, 61, 65A, 65B, 70, 75, 83, 85A, 85B, 92, 95, 102, 105: table
110: reception unit
111: inquiry screen
112: message
113: Yes button
114: No button
DX: movement amount of frame in horizontal direction
DY: movement amount of frame in vertical direction
L(TN, PN): loss function
WK: weight coefficient for each class
F(TK, PK): loss value of each class
TK: correct answer value of each class
PK: predicted value of each class
ST100 to ST180: step

What is claimed is:

1. A mini-batch learning apparatus that learns a machine learning model for performing semantic segmentation, which determines a plurality of classes in an image in units of pixels, by inputting mini-batch data to the machine learning model, the apparatus comprising:
    a calculation unit that calculates an area ratio of each of the plurality of classes in the mini-batch data;
    a specifying unit that specifies a correction target class based on the area ratio;
    an evaluation unit that evaluates a determination accuracy of the class of the machine learning model by calculating a loss value for each of the plurality of classes using a loss function and includes a correction processing unit which executes correction processing of correcting a first loss value of the correction target class based on a comparison result of the first loss value and a second loss value of a class other than the correction target class; and
    an update unit that updates the machine learning model that is learned using the mini-batch data based on the determination accuracy evaluated by the evaluation unit.

2. The mini-batch learning apparatus according to claim 1, wherein
    the specifying unit specifies, as the correction target class, a rare class of which the area ratio is lower than a setting value which is set in advance, and
    the correction processing unit executes, as the correction processing, processing of setting a weight for the first loss value to be larger than a weight for the second loss value.

3. The mini-batch learning apparatus according to claim 1, wherein
    the specifying unit specifies, as the correction target class, a non-rare class of which the area ratio is higher than a setting value which is set in advance, and
    the correction processing unit executes, as the correction processing, processing of setting a weight for the first loss value to be smaller than a weight for the second loss value.

4. The mini-batch learning apparatus according to claim 2, wherein
    the specifying unit specifies, as the correction target class, a non-rare class of which the area ratio is higher than a setting value which is set in advance, and
    the correction processing unit executes, as the correction processing, processing of setting a weight for the first loss value to be smaller than a weight for the second loss value.

5. The mini-batch learning apparatus according to claim 1, wherein
    the specifying unit specifies, as the correction target class, a rare class of which the area ratio is lower than a setting value, and
    the correction processing unit executes, as the correction processing, enlargement processing of setting a correct answer value and a predicted value in calculation of the first loss value to be larger than a correct answer value and a predicted value in calculation of the second loss value.

6. The mini-batch learning apparatus according to claim 5,
    wherein the correction processing unit sets an enlargement ratio in the enlargement processing such that the area ratio of the rare class in the mini-batch data is the same value as the area ratio of the rare class in a learning input image and an annotation image which are sources of the mini-batch data.

7. The mini-batch learning apparatus according to of claim 1, wherein
    the specifying unit specifies, as the correction target class, a non-rare class of which the area ratio is higher than a setting value, and
    the correction processing unit executes, as the correction processing, reduction processing of setting a correct answer value and a predicted value in calculation of the first loss value to be smaller than a correct answer value and a predicted value in calculation of the second loss value.

8. The mini-batch learning apparatus according to of claim 5, wherein
    the specifying unit specifies, as the correction target class, a non-rare class of which the area ratio is higher than a setting value, and
    the correction processing unit executes, as the correction processing, reduction processing of setting a correct answer value and a predicted value in calculation of the first loss value to be smaller than a correct answer value and a predicted value in calculation of the second loss value.

9. The mini-batch learning apparatus according to claim 6, wherein
the specifying unit specifies, as the correction target class, a non-rare class of which the area ratio is higher than a setting value, and
the correction processing unit executes, as the correction processing, reduction processing of setting a correct answer value and a predicted value in calculation of the first loss value to be smaller than a correct answer value and a predicted value in calculation of the second loss value.

10. The mini-batch learning apparatus according to claim 7,
wherein the correction processing unit sets a reduction ratio in the reduction processing such that the area ratio of the non-rare class in the mini-batch data is the same value as the area ratio of the non-rare class in a learning input image and an annotation image which are sources of the mini-batch data.

11. The mini-batch learning apparatus according to claim 8,
wherein the correction processing unit sets a reduction ratio in the reduction processing such that the area ratio of the non-rare class in the mini-batch data is the same value as the area ratio of the non-rare class in a learning input image and an annotation image which are sources of the mini-batch data.

12. The mini-batch learning apparatus according to claim 9,
wherein the correction processing unit sets a reduction ratio in the reduction processing such that the area ratio of the non-rare class in the mini-batch data is the same value as the area ratio of the non-rare class in a learning input image and an annotation image which are sources of the mini-batch data.

13. The mini-batch learning apparatus according to claim 1, further comprising:
a reception unit that receives a selection instruction as to whether or not to cause the correction processing unit to execute the correction processing.

14. The mini-batch learning apparatus according to claim 2, further comprising:
a reception unit that receives a selection instruction as to whether or not to cause the correction processing unit to execute the correction processing.

15. The mini-batch learning apparatus according to claim 3, further comprising:
a reception unit that receives a selection instruction as to whether or not to cause the correction processing unit to execute the correction processing.

16. The mini-batch learning apparatus according to claim 5, further comprising:
a reception unit that receives a selection instruction as to whether or not to cause the correction processing unit to execute the correction processing.

17. The mini-batch learning apparatus according to claim 6, further comprising:
a reception unit that receives a selection instruction as to whether or not to cause the correction processing unit to execute the correction processing.

18. The mini-batch learning apparatus according to claim 7, further comprising:
a reception unit that receives a selection instruction as to whether or not to cause the correction processing unit to execute the correction processing.

19. A non-transitory computer readable recording medium storing an operation program of a mini-batch learning apparatus that learns a machine learning model for performing semantic segmentation, which determines a plurality of classes in an image in units of pixels, by inputting mini-batch data to the machine learning model, the program causing a computer to function as:
a calculation unit that calculates an area ratio of each of the plurality of classes in the mini-batch data;
a specifying unit that specifies a correction target class based on the area ratio;
an evaluation unit that evaluates a determination accuracy of the class of the machine learning model by calculating a loss value for each of the plurality of classes using a loss function and includes a correction processing unit which executes correction processing of correcting a first loss value of the correction target class based on a comparison result of the first loss value and a second loss value of a class other than the correction target class; and
an update unit that updates the machine learning model that is learned using the mini-batch data based on the determination accuracy evaluated by the evaluation unit.

20. An operation method of a mini-batch learning apparatus that learns a machine learning model for performing semantic segmentation, which determines a plurality of classes in an image in units of pixels, by inputting mini-batch data to the machine learning model, the method comprising:
calculating an area ratio of each of the plurality of classes in the mini-batch data;
specifying a correction target class based on the area ratio;
evaluating a determination accuracy of the class of the machine learning model by calculating a loss value for each of the plurality of classes using a loss function and including executing correction processing of correcting a first loss value of the correction target class based on a comparison result of the first loss value and a second loss value of a class other than the correction target class; and
updating the machine learning model that is learned using the mini-batch data based on the determination accuracy that is evaluated.

* * * * *